United States Patent
Adachi et al.

(10) Patent No.: US 9,258,828 B2
(45) Date of Patent: Feb. 9, 2016

(54) WIRELESS COMMUNICATION APPARATUS AND METHOD

(75) Inventors: Tomoko Adachi, Kawasaki (JP); Ryoko Matsuo, Tokyo (JP); Tomoya Tandai, Tokyo (JP); Takeshi Tomizawa, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 160 days.

(21) Appl. No.: 13/406,885

(22) Filed: Feb. 28, 2012

(65) Prior Publication Data

US 2013/0051335 A1 Feb. 28, 2013

(30) Foreign Application Priority Data

Aug. 26, 2011 (JP) ................ 2011-184792

(51) Int. Cl.
*H04W 74/08* (2009.01)
*H04W 16/14* (2009.01)

(52) U.S. Cl.
CPC .......... *H04W 74/0808* (2013.01); *H04W 16/14* (2013.01)

(58) Field of Classification Search
None
See application file for complete search history.

(56) References Cited

U.S. PATENT DOCUMENTS

| | | | |
|---|---|---|---|
| 2005/0153735 A1* | 7/2005 | Morioka | H04L 47/10 455/553.1 |
| 2007/0014266 A1 | 1/2007 | Kondo | |
| 2008/0279210 A1* | 11/2008 | Naka | H04W 28/18 370/448 |
| 2011/0096679 A1 | 4/2011 | Hayashino et al. | |
| 2012/0051293 A1 | 3/2012 | Sakoda et al. | |
| 2012/0281545 A1* | 11/2012 | Fujiwara et al. | 370/242 |
| 2013/0083722 A1* | 4/2013 | Bhargava et al. | 370/315 |

FOREIGN PATENT DOCUMENTS

| | | |
|---|---|---|
| CN | 1893396 A | 1/2007 |
| CN | 1930824 A | 3/2007 |
| JP | 2001-237849 A | 8/2001 |
| WO | 2010128623 A1 | 11/2010 |

OTHER PUBLICATIONS

Chinese Office Action dated Aug. 20, 2014, issued in counterpart Chinese Application No. 201210046610.6.

* cited by examiner

*Primary Examiner* — Adnan Baig
(74) *Attorney, Agent, or Firm* — Holtz, Holtz & Volek PC

(57) ABSTRACT

According to one embodiment, a wireless communication apparatus includes a storage, a selection unit, a processing unit. The storage stores a first set and a second set, including first frame spaces of one or more types and the second set including second frame spaces of the one or more types, each of the second frame spaces that are identical in type to the first frame spaces being not less than the first frame spaces, and a second frame space of any one of the types being longer than a first frame space of the any one of the types. The selection unit selects either the first set or the second set. The processing unit communicates with a first apparatus, by using either the first frame spaces or the second frame spaces.

20 Claims, 14 Drawing Sheets

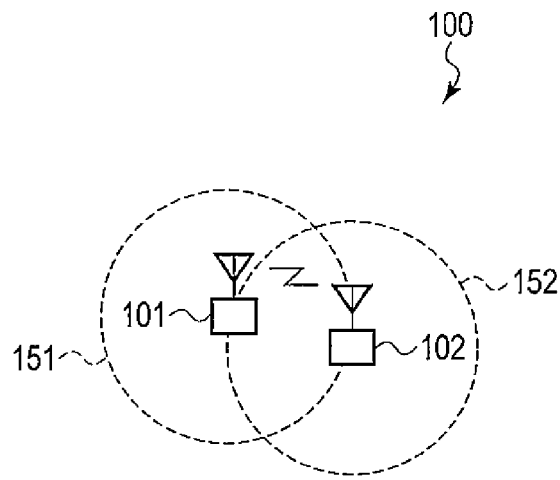
F I G. 1
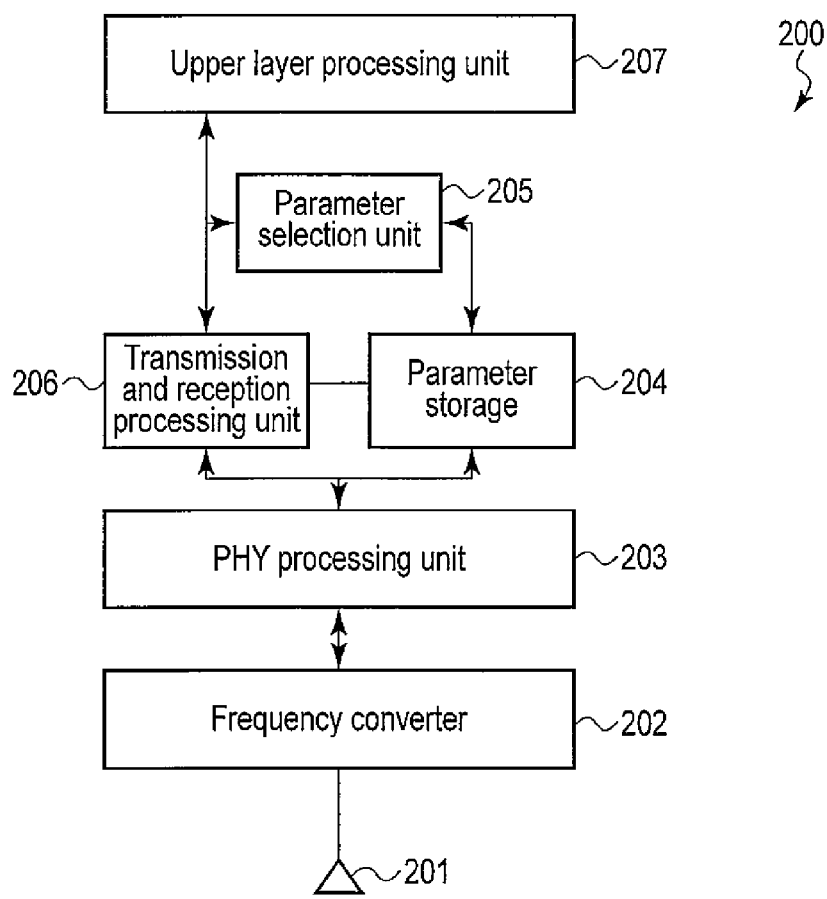
F I G. 2

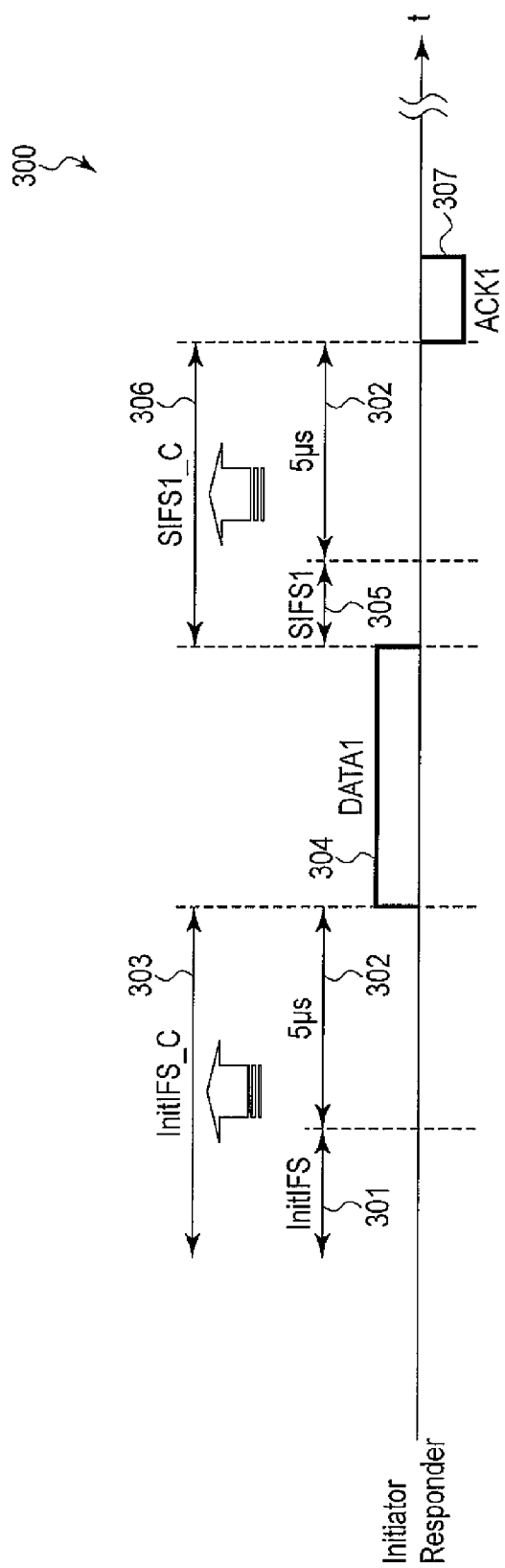
F I G. 3

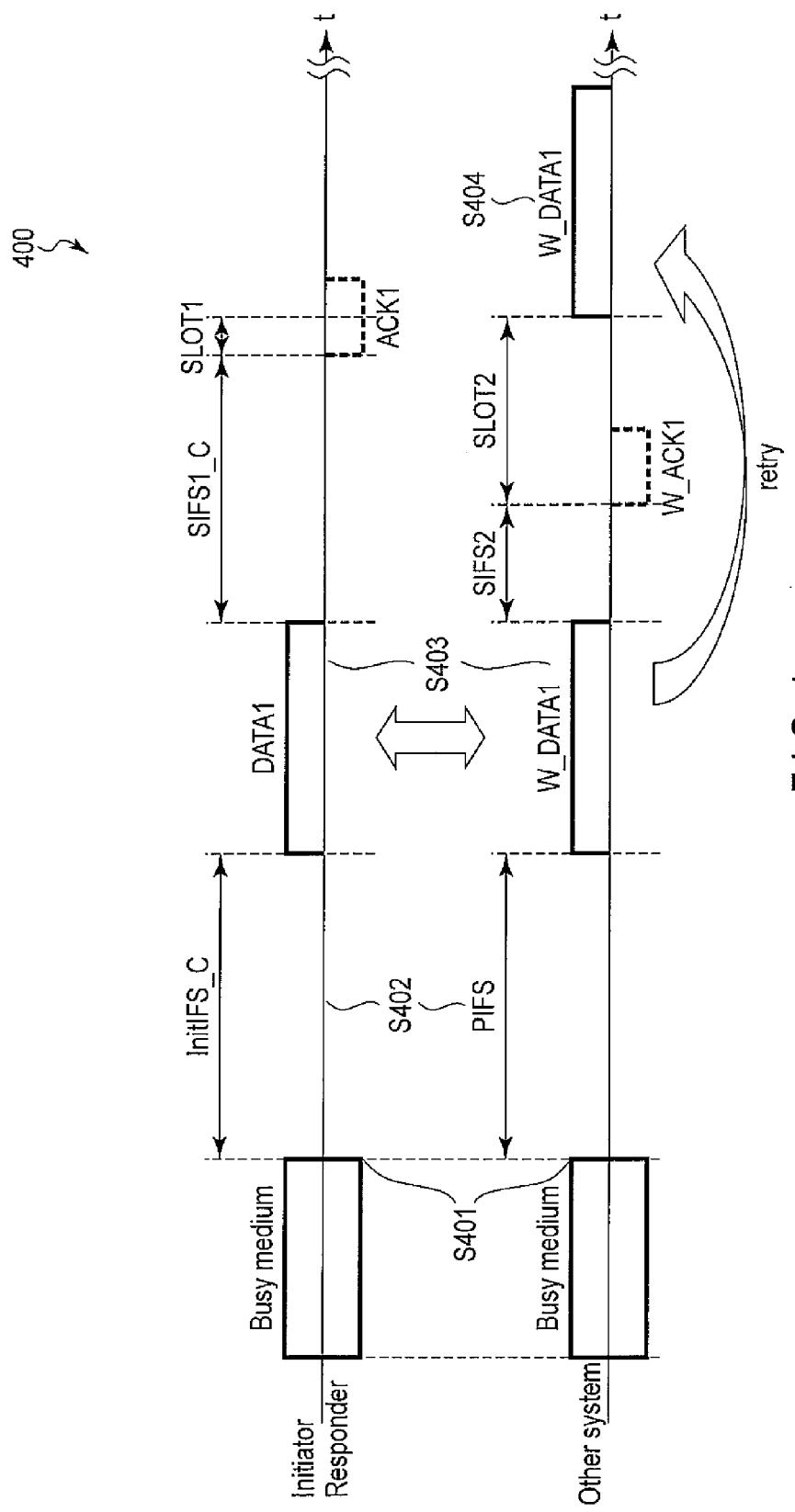
F I G. 4

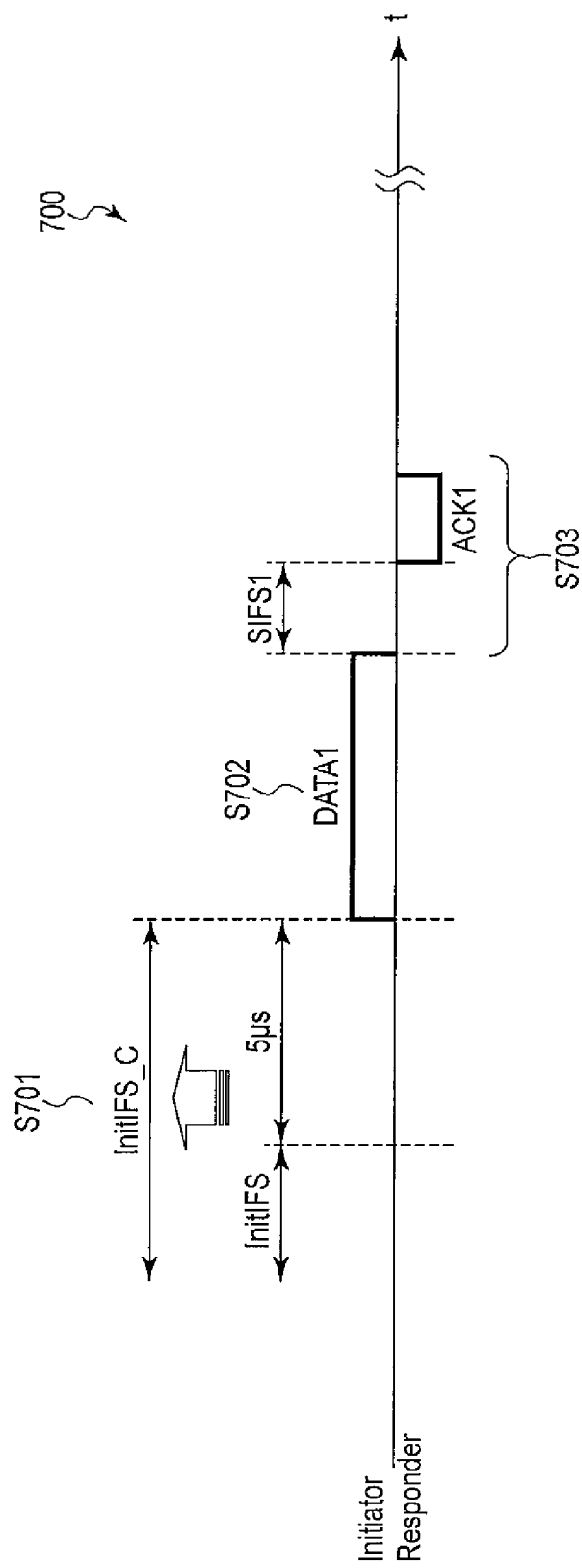
F I G. 7

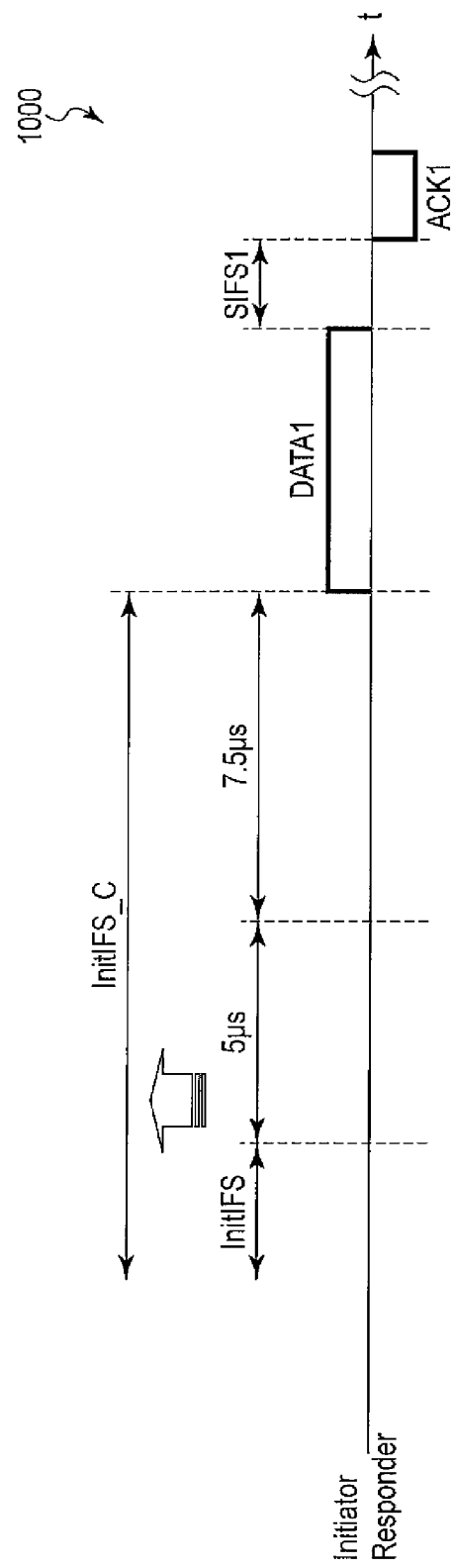
F I G. 10

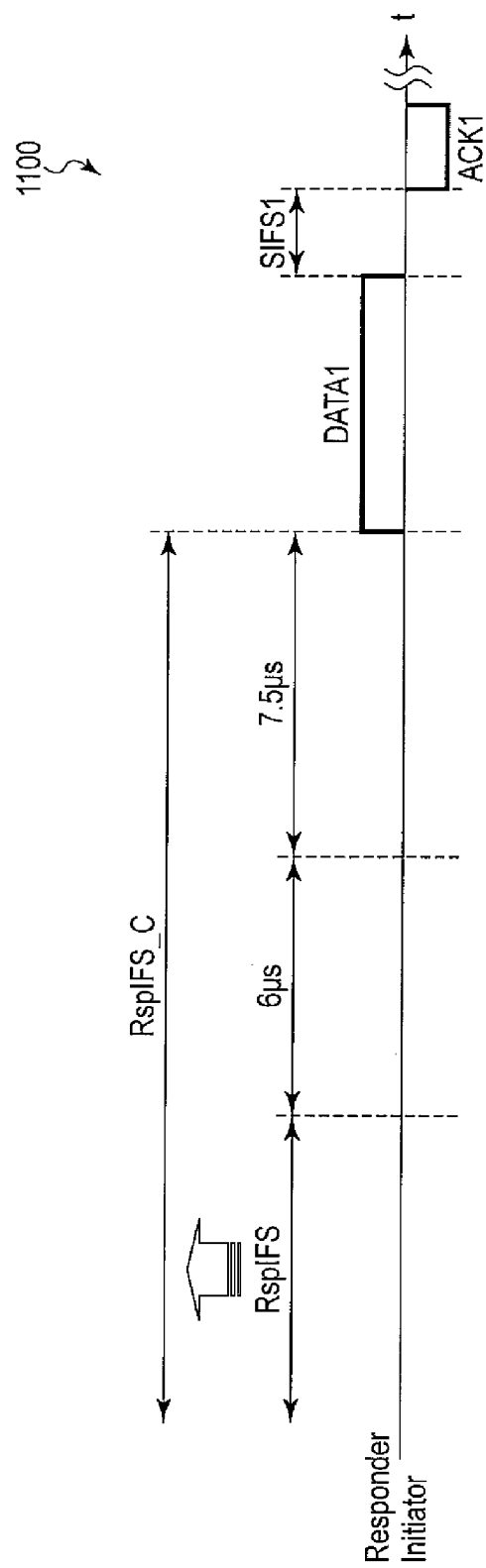
F I G. 11

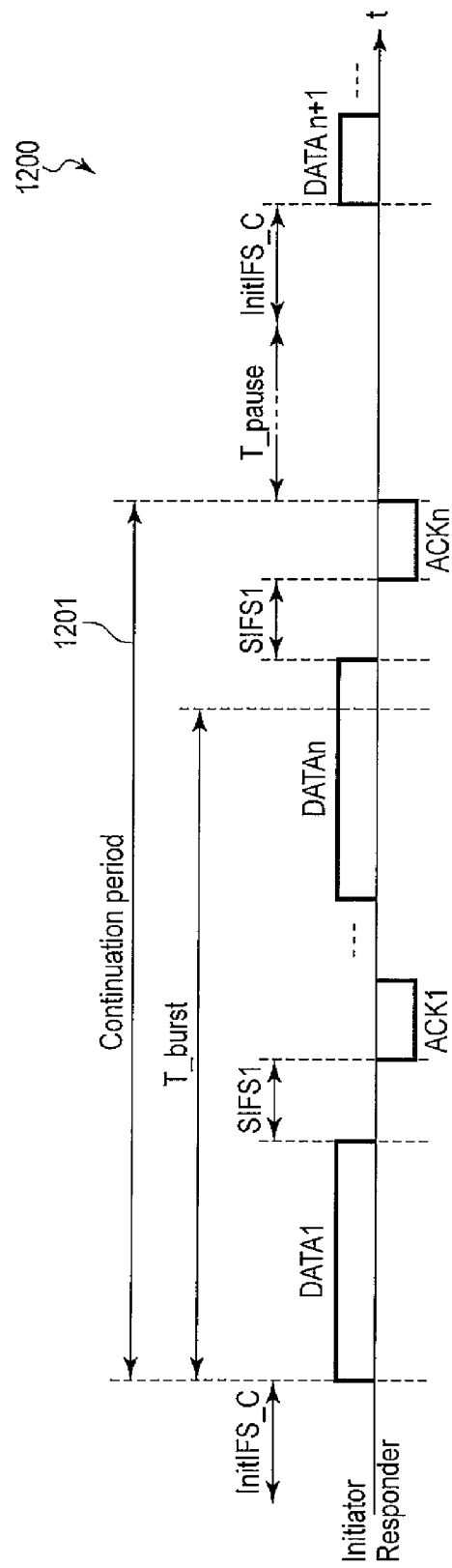
F I G. 12

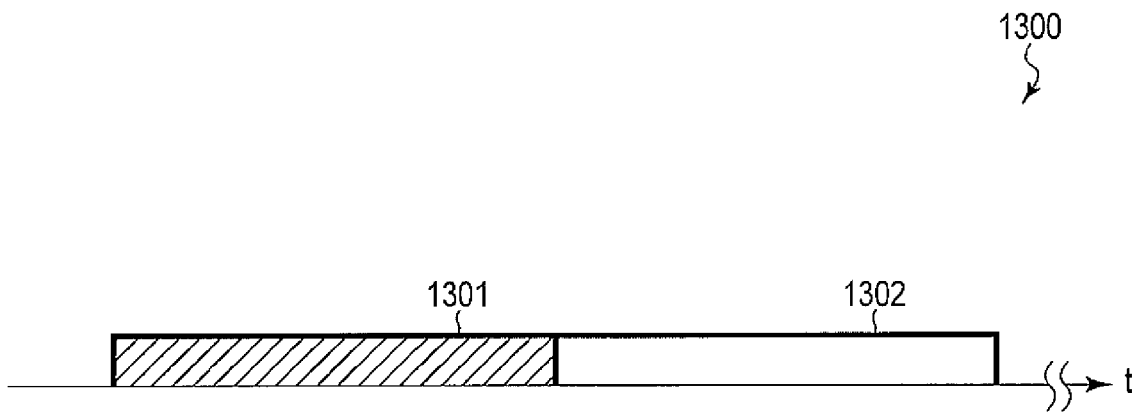
F I G. 13
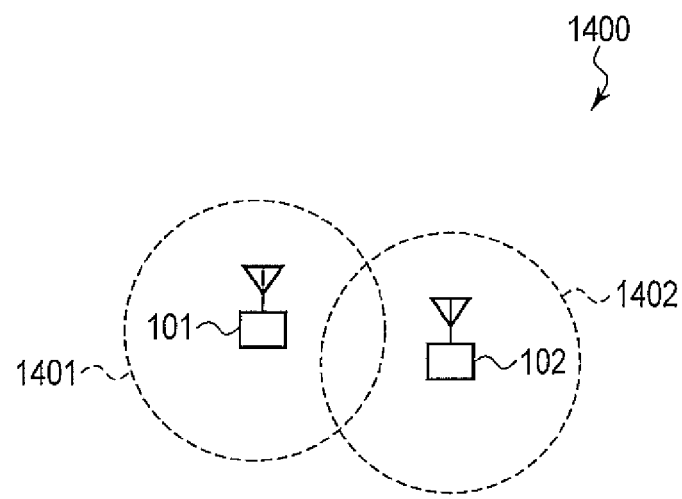
F I G. 14

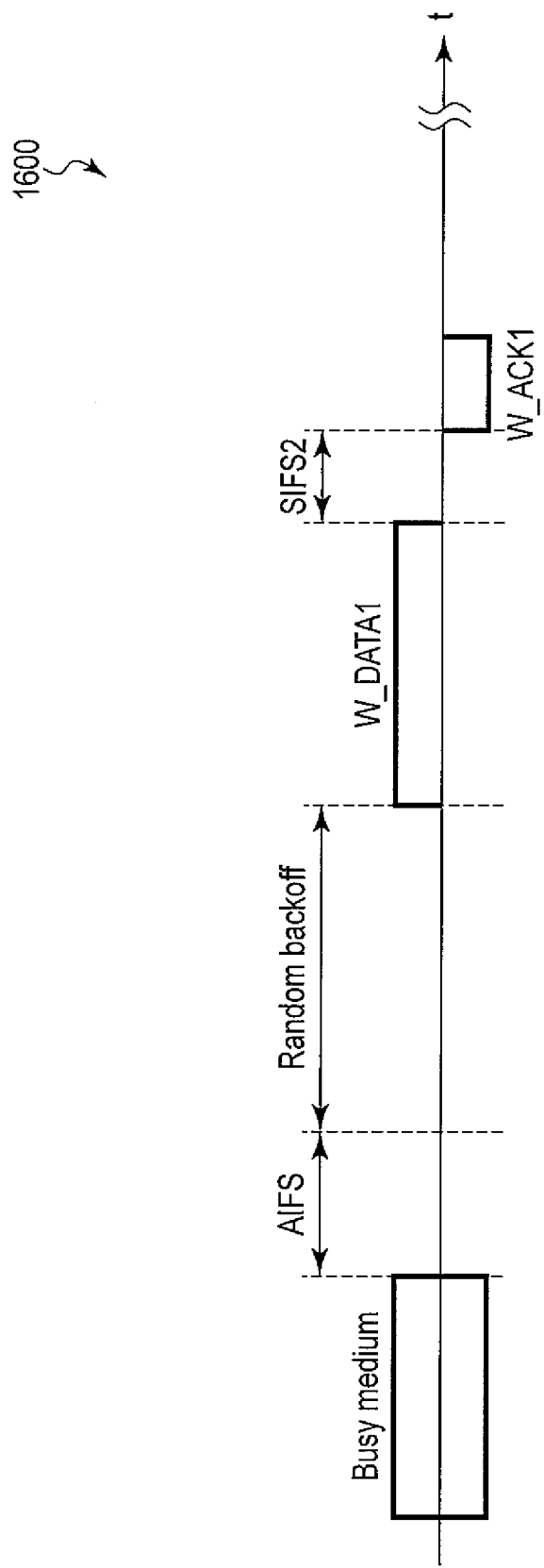
F I G. 16

US 9,258,828 B2

WIRELESS COMMUNICATION APPARATUS AND METHOD

CROSS-REFERENCE TO RELATED APPLICATIONS

This application is based upon and claims the benefit of priority from prior Japanese Patent Application No. 2011-184792, filed Aug. 26, 2011, the entire contents of which are incorporated herein by reference.

FIELD

Embodiments described herein relate generally to a wireless communication apparatus and method.

BACKGROUND

There is a technique for controlling a non-transmission period, using Carrier Sense Multiple Access with Collision Avoidance (CSMA/CA) in order to suppress interference from and to other wireless systems.

BRIEF DESCRIPTION OF THE DRAWINGS

FIG. 1 is diagram illustrating the concept of a point-to-point near field communication system according to the present embodiment;

FIG. 2 is a block diagram of a wireless communication apparatus according to the first embodiment;

FIG. 3 illustrates an example of a frame exchange where the wireless communication apparatuses according to the first embodiment coexist with another system;

FIG. 4 illustrates an example of operation sequences where access by an initiator and preferential access in another system coincide;

FIG. 7 illustrates an example of a frame exchange by wireless communication apparatuses according to the fourth embodiment where data is transmitted from an initiator;

FIG. 10 illustrates an example of a frame exchange by wireless communication apparatuses according to the fifth embodiment where data is transmitted from an initiator;

FIG. 11 illustrates an example of a frame exchange by the wireless communication apparatus according to the fifth embodiment where data is transmitted from a responder;

FIG. 12 illustrates an example of frame exchanges by wireless communication apparatuses according to the sixth embodiment;

FIG. 13 illustrates an example of switching a set for frame exchanges at a wireless communication apparatus according to the seventh embodiment;

FIG. 14 illustrates an example of physical wireless link disconnection in a point-to-point near field communication system;

FIG. 16 illustrates an example of a frame exchange during a contention period in an IEEEE802.11 wireless Local Area Network (LAN).

DETAILED DESCRIPTION

Figure 5:
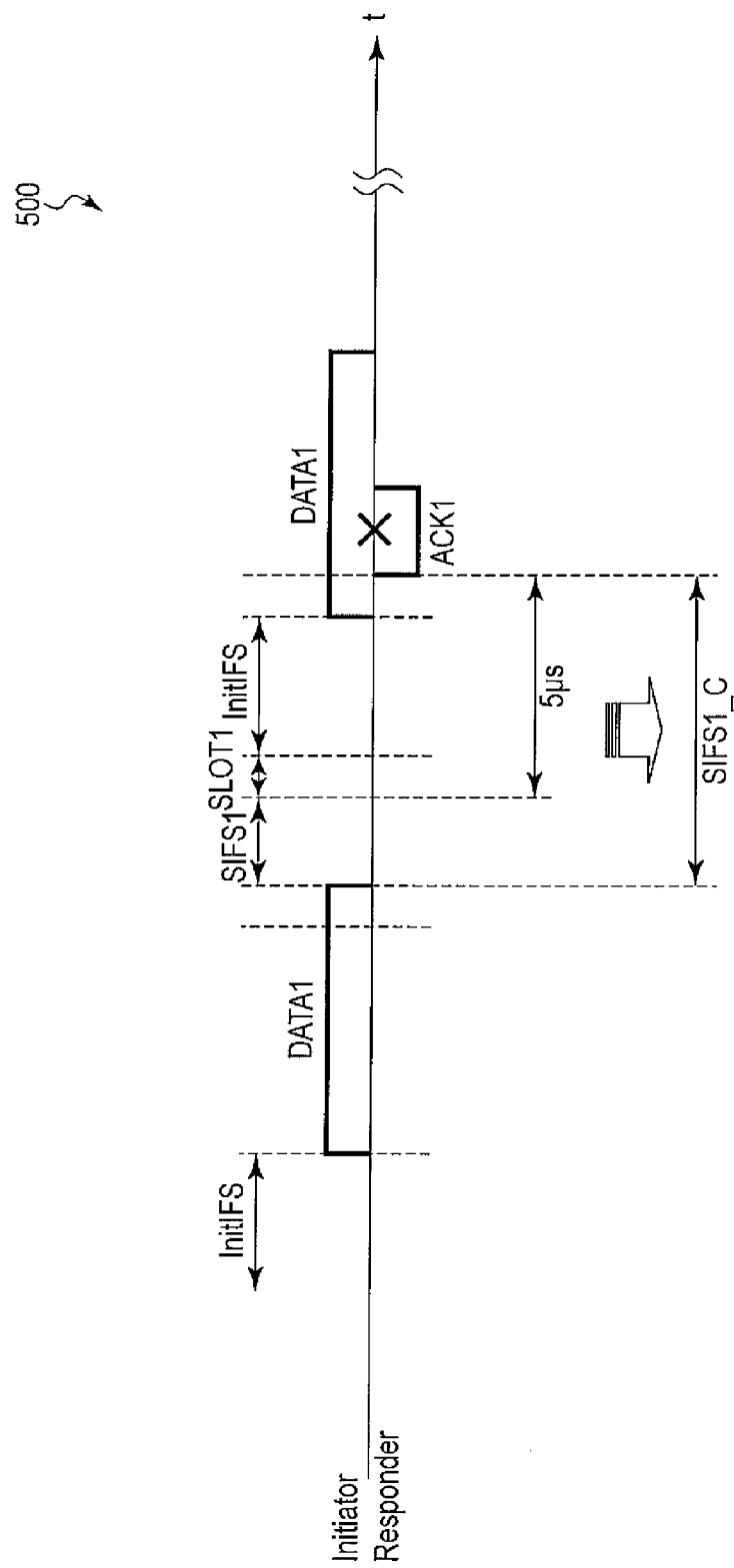
FIG. 5 illustrates an example where an inter frame space is altered during a frame exchange.

Generally, to estimate when to set a period to suppress transmission in CSMA/CA, periodicity of transmission at another wireless system has to be expected. For a wireless system that cannot secure periodic transmission, the period to suppress transmission cannot be estimated. Furthermore, CSMA/CA is a system suitable for a wireless system where a plurality of wireless communication apparatuses communicate with each other under a potential for competition among this plurality of wireless communication apparatuses. Therefore, if CSMA/CA is always used in a point-to-point near field communication system, overheads increase and efficiency decreases. As a result, where efficient point-to-point near field communication is sought after, a medium cannot be fairly shared with communication apparatuses of other wireless systems coexisting and that cannot expect periodic transmission.

In general, according to one embodiment, a wireless communication apparatus includes a storage, a selection unit, a transmission and reception processing unit. The storage is configured to store a first set and a second set, the first set including first inter frame spaces of one or more types and the second set including second inter frame spaces of the one or more types, each of the second inter frame spaces that are identical in type to the first inter frame spaces being not less than the first inter frame spaces, and one of the second inter frame spaces of any one of the types being longer than one of the first inter frame spaces of the any one of the types. The selection unit is configured to select either the first set or the second set in order to use for communication. The transmission and reception processing unit is configured to communicate with a first apparatus using a first communication scheme, by using either the first inter frame spaces or the second inter frame spaces according to a selection result of the selection unit.

A wireless communication apparatus and method according to an embodiment in the present disclosure will now be described in detail with reference to the accompanying drawings. In the description of the embodiment below, parts labeled with the same reference sign perform the same operation, and duplicate explanation is omitted where unnecessary.

First Embodiment

In the present embodiment, it is assumed that two wireless communication apparatuses compose a point-to-point near field communication system. Point-to-point communication refers to a situation in which after a connection is established with a certain wireless communication apparatus, communication is made only with the same wireless communication apparatus until the connection terminates. The near field communication is a communication system that is limited to an extremely narrow communication range. It is assumed that wireless communication apparatuses located within a communication range (coverage) having an order of several centimeters, for example 3 cm, are able to communicate with each other. If wireless communication apparatuses contain an antenna or antennas, communication may be carried out by sticking these apparatuses together.

The present embodiment also assumes the case where a point-to-point near field communication system coexists with a wireless communication system (hereinafter referred to as "another system") that uses another communication scheme different from the point-to-point near-field communication system. The term "coexistence (coexist)" refers to, for example, a situation in which a wireless communication apparatus of a wireless communication system having a wider communication range, which uses another communication scheme, can detect a wireless signal from the wireless communication apparatus of the point-to-point near field communication system. Specifically, communication in the point-to-point communication system also affects, for example, interferes with, the wireless communication system with a wider communication range. In the present embodiment, such a situation is defined as "coexistence with another system." A communication range difference, which will be described in detail below, is determined as the sum of the maximum transmission power with the antenna gain. Accordingly, if the communication range of the point-to-point near field communication system is narrower than that of another system, the sum of maximum transmission power with antenna gain in the point-to-point near field communication system is smaller than the sum of maximum transmission power and antenna gain in the other system.

The concept of a point-to-point near field communication system will now be described with reference to FIG. 1.

A near field communication system 100 includes a wireless communication apparatus 101 and a wireless communication apparatus 102. In the example in FIG. 1, the wireless communication apparatus 102 is located within the communication range 151 of the wireless communication apparatus 101, and the wireless communication apparatus 101 is located within the communication range 152 of the wireless communication apparatus 102. Accordingly, the wireless communication apparatuses 101 and 102 wirelessly communicate with each other.

The procedure for establishing a connection for wireless communication, that is, the procedure for setting up communication is the procedure for mutually exchanging pieces of information, in order to mutually obtain information to carry out wireless communication. Examples of mutual pieces of information include, IDentifiers (IDs) and, if a plurality of versions exist in a communication method, corresponding version numbers. Additionally, the examples may include parameter information in an upper layer in order to make the determination as to whether to allow communication with another wireless communication apparatus, by verifying compatibility in the layer above the wireless access protocol layer.

When a connection is established, one of two wireless communication apparatuses serves as an initiator, and the other, as a responder. The procedure for determining the relation between initiator and responder may be, for example, as follows:

The wireless communication apparatus 101 transmits a connection request frame to the wireless communication apparatus 102, and the wireless communication apparatus 102 receives the connection request frame. The wireless communication apparatus 102 makes a determination to accept the wireless communication apparatus 101 as a connection target, and transmits to the wireless communication apparatus 101 the connection acceptance frame used to inform it that the wireless communication apparatus 101 is accepted as a connection target.

The wireless communication apparatus 101 receives the connection acceptance frame, makes a determination to accept the wireless communication apparatus 102 as a connection target, and transmits a response frame corresponding to the connection acceptance frame to the wireless communication apparatus 102, which then serves as a communication partner. By virtue of this procedure, a connection is established between the wireless communication apparatuses 101 and 102. In such a connection establishment procedure, the wireless communication apparatus that transmitted the connection request frame, namely, in this example, the wireless communication apparatus 101, serves as an initiator; and the wireless communication apparatus that transmitted the connection acceptance frame, namely, in this example, the wireless communication apparatus 102, serves as a responder.

Next, a wireless communication apparatus according to the first embodiment will be described with reference to FIG. 2.

The wireless communication apparatus 200 according to the first embodiment includes an antenna 201, frequency converter 202, PHYsical (PHY) processing unit 203, parameter storage 204, parameter selection unit 205, transmission and reception processing unit 206, and upper layer processing unit 207.

The antenna 201 is connected to the frequency converter 202 (described below), and receives from or transmits to the outside a wireless signal. The configuration of the antenna may be that of a general configuration, such as a dipole antenna or a patch antenna, and detailed explanation here is, therefore, omitted. The wireless communication apparatus 200 according to the first embodiment includes the antenna 201 and can, thereby, be configured as one apparatus that includes even the antenna 201, which accordingly enables a reduction in mounting area. Moreover, the wireless communication apparatus 200 can be reduced in size by using the antenna 201 for both transmission and reception. In the present embodiment, the number of antennas 201 is one, as an example; however, more than one antenna 201 may be used.

In a reception process, the frequency converter 202 receives a wireless signal from the antenna 201, and demodulates this wireless signal into a baseband signal that can be processed by the PHY processing unit 203 (described below). In a transmission process, the frequency converter 202 receives a physical packet from the PHY processing unit 203, and modulates the packet to a wireless signal of, for example, 60-GHz millimeter frequency band for transmission.

In the reception process, the PHY processing unit 203 receives a baseband signal from the frequency converter 202, and performs processes on the baseband signal such as a physical packet decryption process, and processes for removing preambles, physical headers, etc. After these processes are performed, the PHY processing unit 203 extracts, as a frame, a payload portion. In a transmission process, the PHY processing unit 203 receives a frame and a transmission instruction from the transmission and reception processing unit 206, performs processes such as coding, and converts the frame into a physical packet.

Before passing the frame to the transmission and reception processing unit 206, the PHY processing unit 203 inputs a notice signal to the transmission and reception processing unit 206 indicating initiation of the reception of a physical packet. After passing the frame to the transmission and reception processing unit 206, the PHY processing unit 203 inputs to the transmission and reception processing unit 206 a notice signal indicating the completion of reception of the physical packet. Additionally, a notice of detection of error in the physical packet, and information about the status of the wireless medium are given to the transmission and reception processing unit 206.

The parameter storage 204 stores two sets of parameters relating to inter frame spaces. An inter frame space refers to a pause provided before a frame is transmitted. To be more specific, the inter frame space refers to a pause provided before a frame is transmitted after a frame is transmitted from its own apparatus, after a frame is received from a wireless communication apparatus in the same system, after a wireless signal is received from a wireless communication apparatus in a different wireless system, or after a carrier is determined to have been busy as a result of carrier sense on a wireless medium and then the carrier is determined to have become idle again. In any of the above cases, when there is a mechanism to recognize a carrier as busy during the transmission of a frame from its own apparatus, the inter frame space ultimately refers to the time required to transmit a frame after detecting that a carrier has become idle again after determining the carrier as busy as a result of the carrier sense on the wireless medium.

The first set that the parameter storage stores is inter frame spaces used normally, that is, where anti-interference measures are not required. To be precise, the first set includes an initiator inter frame space (InitIFS), a responder inter frame space (RspIFS), and a short inter frame space (SIFS). These, for example, are designated the first set. The second set includes inter frame spaces used where anti-interference measures are required, and a value of the inter frame space having the same type with the inter frame space in the first set is equal to or greater than that of the inter frame space in the first set. These are referred to as InitIFS_C, RspIFS_C, and SIFS_C. For example, these are designated the second set. In addition, where Extended RspIFS (ERIFS) is to be provided, ERIFS and ERIFS_C are added to each set in the same manner. The types of the inter frames in each set are described later.

Instead of storing two sets, the parameter storage 204 may store one set (i.e., InitIFS, RspIFS, and SIFS, in the above example) and an offset value.

The parameter storage 204 makes a set selected by a parameter selection unit 205 (described below) to be used by the transmission and reception processing unit 206. That is, the transmission and reception processing unit 206 may be enabled to refer to a set to be used. Or alternatively, a set to be used may be passed to the transmission and reception processing unit 206.

Additionally, a set stored in the parameter storage 204 may be set or changed by the transmission and reception processing unit 206 or the parameter selection unit 205.

The parameter selection unit 205 determines which of the sets relating to inter frame spaces stored in the parameter storage 204 should be used. If the parameter storage 204 stores one set and an offset value, the parameter selection unit 205 determines whether to use this offset value or not. A choice between sets is made based on, for example, information about transmission errors, such as the number of re-transmissions or transmission failure, or information about reception errors, such as decoding failure or carrier being lost in the course of transmission: such information being captured via the transmission and reception processing unit 206. Alternatively, a choice between sets can be made based on information, or the like, about access, such as busy time in carrier sense or a time taken from preparation to actual transmission for a transmission frame.

That is, if a determination is made based on the above-mentioned information that a certain value is equal to or larger than a threshold value, it is assumed that another system is or may be located nearby, in other words, it is assumed that communication is or may be affected by another system. Consequently, the parameter selection unit 205 determines that it is necessary to avoid interference with another system. For example, if the number of retransmissions is equal to or larger than a threshold value, the parameter selection unit 205 determines that interference and coexistence measures are required, and may select the second set as an inter frame space. The parameter selection unit 205 informs the parameter storage 204 of the selected set, and the parameter storage 204 can recognize the set selected by the parameter selection unit 205.

Upon instruction from the upper layer processing unit 207, the parameter selection unit 205 may change a determining method. Specifically, the parameter selection unit 205 may determine which of the sets stored in the parameter storage 204 should be used, and the reception/transmission processing unit 206 may transmit/receive a frame using the selected set. The timing for changing a set in the transmission and reception processing unit 206 is the point at which a data or management frame is transmitted, that is, the point of acquisition of an access right on a wireless medium.

The transmission and reception processing unit 206 deals with the types of frames used in the point-to-point near field communication system, namely, data frames, control frames, and management frames, and receives from the parameter selection unit 205 instructions as to which of the inter frame spaces in the first and second sets should be used. With reference to the sets of inter frame spaces stored in the parameter storage 204 and by use of the inter frame spaces in the first or second set, the transmission and reception processing unit 206 establishes a wireless link (connection) with other wireless communication apparatuses and carries out frame exchange.

The transmission and reception processing unit 206 performs a process relating to Media Access Control (MAC). As for data frames, control of data frame transmission on the transmission side and sequential re-arrangement of data on the reception side may be carried out such that the order of data transmission and order of data reception match at an application layer level between the wireless communication apparatuses that mutually exchanging data. Specifically, in the case of a reception process, the transmission and reception processing unit 206 receives a data frame from the PHY processing unit 203, and creates a response frame to give an acknowledgement to that data frame. The transmission and reception processing unit 206 passes the response frame to the PHY processing unit 203 after a brief period or Short Inter frame Space (SIFS) has elapsed since completion of reception of the physical packet containing the data frame. A description of the SIFS is given later. Moreover, the transmission and reception processing unit 206 rearranges the received data frames in sequence as necessary, and extracts data from each data frame.

In the case of a transmission process, the transmission and reception processing unit 206 receives data from the upper layer processing unit 207 (described below) and converts the data into a data frame. The transmission and reception processing unit 206 times transmission, and passes both the created data frame and a transmission instruction to the PHY processing unit 203. At this time, the transmission/processing unit 205 may also give instructions for modulation and coding schemes, or the like, required for transmission. In the case of a frame (data frame or management frame) which is a subject for retransmission, unless the reception of a response frame to the frame transmitted is initiated within a predetermined time after the transmission, it is determined that transmission failure has occurred, and the frame is retransmitted. These processes for retransmission are similar to those in a previously known technique, and the explanation thereof is omitted here. If a response frame to the transmitted frame is received, determination is made that retransmitting the transmitted frame is unnecessary.

In the reception process, the upper layer processing unit 207 receives data from the transmission and reception processing unit 206 and inputs data to an application. In the transmission process, the upper layer processing unit 207 receives data to be transmitted from the application through, for example, the operation of a user, and passes the data to the transmission and reception processing unit 206.

The wireless communication apparatus 200 according to the first embodiment is provided with only one PHY processing unit 203 and only one transmission and reception processing unit 206. The embodiment is not limited thereto but may have a plurality of different PHY processing units and transmission and reception processing units corresponding to the PHY processing units or may have a common processing unit for different PHY processing units.

Next, an example of a frame exchange when the wireless communication apparatus according to the first embodiment coexists with another system will be described with reference to FIG. 3.

The sequence 300 between the wireless communication apparatuses shown in FIG. 3 shows a frame exchange between an initiator and a responder in time series. The upper side from the time axis in FIG. 3 represents operation of the wireless communication apparatus that serves as an initiator, and the lower side represents operation of the wireless communication apparatus that serves as a responder.

The regular inter frame spaces used in a point-to-point near field communication system has three types: InitIFS, RspIFS, and SIFS. However, in order to distinguish it from its use in another system described below, SIFS here is referred to as SIFS1 for convenience.

The InitIFS is an inter frame space provided when an initiator starts a frame exchange. The RspIFS is an inter frame space provided when a responder starts a frame exchange. The SIFS1 is an inter frame space used when a response frame, which serves as an acknowledgement for a management frame or data frame, is transmitted. For example, a frame exchange is initiated, by the transmission of a data frame or management frame and the reception of a response frame which is an acknowledgement to the data frame or management frame. If a response frame is not received, it is assumed that the frame exchange has failed.

For example, the minimum InitIFS is 3.0 µs: a time interval of 3.0 µs or longer suffices. The minimum RspIFS is 7.0 µs: a time interval of 7.0 µs or longer suffices. The minimum and maximum values of SIFS1 are 2.0 µs and 2.5 µs, respectively.

As described above, the regular InitIFS 301 has a minimum of 3 µs. However, in the first embodiment, it is assumed that the InitIFS 301 is an inter frame space having the same concept as PIFS that is the inter frame space prepared for preferential transmission in another system. Therefore, so as to have the same period as the PIFS the period of the inter frame space is extended by adding the offset period 302 to the InitIFS 301. In the first embodiment, an offset period 302 is set to 5 µs in order to have the same period as the other system (8 µs). In this case, the inter frame space resulting from adding the offset period 302 (5 µs) to the InitIFS 301 is called InitIFS_C 303. Similarly, the inter frame space resulting from adding the offset period 302 (5 µs) to the SIFS1 305 is called SIFS1_C 306.

An initiator transmits data (DATA1) 304 to a responder after a period of InitIFS_C 303 has elapsed. Then, the responder that received the data 304 transmits ACK 307 to the initiator after a period of SIFS1_C 306 has elapsed.

As described above, the value of an inter frame space used by the initiator at the initiation of a frame exchange matches with the inter frame space (P IFS in the first embodiment) prepared for preferential transmission in another system. Thereby, access by the initiator and preferential access by the other system become equal. Therefore, responder access becomes inferior to preferential access in the other system. Accordingly, the situation where the initiator and responder have advantage to the wireless communication apparatus of the other system by being able to start frame exchanges with shorter inter frame spaces can be improved to be more fair.

A description has been given with reference to FIG. 3 illustrating the case where the data frame is transmitted by the initiator. However, a responder may use an offset similarly. For example, an offset period of 5 µs is added to RspIFS. RspIFS_C in which the minimum period becomes 7 µs+5 µs=12 µs is defined for use, and RspIFS_C may be used at the initiation of a frame exchange.

Next a sequence where access by the initiator and preferential access in another system coincide will be explained with reference to FIG. 4.

In FIG. 4, the upper side shows the operating sequence of a point-to-point near field communication system according to the present embodiment, and the lower side shows the operating sequence of wireless apparatuses in another system.

In step S401, the initiator and a wireless communication device in another system determine by sensing that the busy state of a carrier is over (i.e., the idle state of a carrier is sensed again). In this case, the carrier sense detected to be busy is caused by, for example, a transmission from either one of the wireless systems.

In Step S402, the initiator of the point-to-point wireless communications system according to the first embodiment provides a period of InitIFS_C, and a wireless apparatus in another system provides a period of PIFS.

In step S403, the initiator and the wireless communication apparatus in the other system transmit data frames (DATA1 and W_DATA1 respectively). Since InitIFS_C and PIFS have the same period, 8 µs, the DATA1 and W_DATA1 collide. As a result, the wireless communication apparatuses on receiving side of the data frames (i.e., the responder and the wireless apparatuses which serve as a receiver of the data frame in the other system) cannot receive and decode the data frames. Therefore, the responder does not transmit ACK1, which is a response frame; and the wireless apparatus, which serves as the receiver of the W_DATA1 frame in the other system, does not transmit W_ACK1, which is a response frame.

As a result of checking the presence or absence of each response frame, the wireless apparatus on the data transmission side of the other system determines that there is no response frame and retransmits the data frame in step S404. In this case, it is assumed that the DATA1 and W_DATA1 occupy the same period by chance. Where an IEEE802.11 wireless LAN (Local Area Network) system is assumed as the other system, the wireless apparatus that transmits the data frame after PIFS has elapsed determines the presence or absence of a response frame in the first half of a period of SLOT2 (5 µs) after SIFS2 (3 µs) from the transmission of the data frame W_DATA1. That is, if busy in the carrier sense ("carrier sense busy") is not detected in this period, the operation of switching to transmission from reception is performed within a period of SLOT2, and the W_DATA1 is retransmitted after the SLOT2 period has elapsed. That is, the W_DATA1 is transmitted after a period SIFS2+SLOT2 (i.e., 8 µs) has elapsed since the transmission of the W_DATA1.

On the other hand, the initiator of the point-to-point near field communication system according to the present embodiment determines the presence or absence of a response frame, namely ACK1, within a SLOT period (in FIG. 4, indicated by SLOT1) after SIFS1_C (a minimum of 7 µs), in which an offset period of 5.0 µs is added, from the transmission of the data frame DATA1. The SLOT1 is set to a period of 1.0 µs, which is common to a regular state and the case where other inter frame spaces are adjusted to long ones due to interference measures. In addition, as one of the parameters relating to inter frame spaces, SLOT1_C (1.0 µs+5.0 µs=6.0 µs) may be newly defined and used by adding an offset period of 5.0 µs to SLOT1 as an interference measure in the same manner as with other inter frame spaces. In the example where data frames collide as shown in FIG. 4, the initiator does not receive the ACK1 within the predetermined time. Therefore, after confirming the state of carrier sense again, the DATA1 is retransmitted.

At the initiator in the operation after SLOT1 (1.0 µs) elapses, it attempts to retransmit the DATA1 after taking a period of InitIFS_C. However, in the example shown in FIG. 4, there is a transmission of W_DATA1 by the other system. Additionally, subsequent to this transmission, W_ACK1 in response to W_DATA1 is transmitted after SIFS2 (3.0 µs) by the other system. Furthermore, if a data frame to be transmitted still remains in the other system, within transmission burst time restrictions, it can be assumed that a series of frame exchanges are carried out such as followed by the next data frame W_DATA2 transmitted after SIFS2 of 3 µs. During this time, the initiator cannot take the period of time where carrier sense is idle for the InitIFS_C, and hence cannot retransmit the DATA1 until the other system finishes such a series of frame exchanges.

As described above, access by the initiator and the access by another system using preferential PIFS are equal at the time of the first access to the medium. However, in a recovery operation (i.e., in retransmission), the other system becomes overwhelmingly advantaged. On the other hand, the InitIFS_C used by the initiator to access the medium is shorter than inter frame spaces (AIFS and DIFS used at a normal time and EIFS used in case of error) other than the PIFS that has highest priority, used for access in the other system; therefore, the initiator has advantage to those accesses using inter frame spaces other than PIFS. Additionally, an inter frame space RspIFS_C used at the time of access by a responder is 12 µs. Therefore, it becomes shorter than any of the default values (described later) of inter frame spaces, other than the PIFS, used at the time of access in the other system, and the responder becomes advantaged.

A description was given above using the example where an offset period is set so that InitIFS_C and PIFS have equal periods. However, the embodiment is not limited to this and the offset period may be set so that the InitIFS_C and other inter frame spaces may have equal periods. For example, instead of the PIFS, an offset period may be set such that the InitIFS_C has an equivalent value to any one of AIFSs and DIFS, which are used for contention in another system and where AIFS varies in value according to each access category. Specifically, an offset period of 10 µs is added to InitIFS so that the default value (13 µs) of AIFS for AC_VI/AC_VO and InitIFS have equal periods. Also, an offset period of 10 µs is added to each of the other inter frame spaces used in the point-to-point near field communication system.

In the first embodiment described above, an offset period in which the inter frame space of the other system is taken into account is added to the inter frame spaces of the point-to-point near field communication system according to the present embodiment, thereby more equally sharing a medium between the near field communication system and the other system. That is, communication opportunities can be obtained in each of the wireless communication systems at least without causing a situation where either one of the wireless communication system occupies a medium so monopolistically for a long period that the other wireless communication system determines that communication has been disconnected.

Second Embodiment

In the first embodiment, both the initiator and responder store a first set, namely the IFS that is a regular interval, and a second set, namely the IFS that is obtained by adding an offset of fixed length to each of all inter frame spaces. Therefore, if the sets of equal inter frame spaces are not used, a difference between the IFSs emerges. In the second embodiment, where either an initiator or responder determines that it is necessary to set a longer inter frame spaces, the other is notified of the use of the set (i.e., the second set) that has longer inter frame spaces. In this way, the initiator and responder can use the same set of inter frame spaces while dynamically switching between the sets.

Now, with reference to FIG. 5, a description is given of an example where, in a point-to-point near field communication system according to the first embodiment, an inter frame space is altered during frame transmission or reception.

In FIG. 5, the upper side shows the operating sequence of an initiator, and the lower side, the operating sequence of a responder.

In the point-to-point near field communication system, the timing of an alteration to a set for an inter frame space is if a data or management frame is transmitted, that is, when an access right to a wireless medium is obtained. Therefore, the set for the inter frame space should not be altered when a response frame to a received data or management frame is transmitted. Specifically, before transmitting DATA1 to a responder, the initiator may alter an inter frame space from InitIFS to InitIFS_C. However, the responder should not alter an inter frame space from SIFS to SIFS_C when transmitting ACK, which is a response frame to the reception of DATA1, to the initiator.

In the example shown in FIG. 5, the initiator checks whether the initiator has received ACK1 from the responder within a period SIFS1 (a minimum of 2.0 µs)+SLOT1 (1.0 µs) after the transmission of the DATA1. As a result, even if the responder tries to transmit a response frame ACK1 after SIFS1_C (a minimum of 7 µs) has elapsed since the reception of the DATA1, the initiator will already have determined that the response frame ACK1 has not been transmitted by the responder; then shifts to a retransmitting process; and retransmits the DATA1 to the responder when "SIFS1+SLOT1+InitIFS" (a minimum of 6 µs) passes.

On the other hand, it is assumed that a switching time of 1.0 µs is required to transmit the ACK1 to the initiator when SIFS1_C passes. In this case, even if the operation for waiting for the result of carrier sense is taken into account, the initiator shifts to the process of retransmitting the DATA1 by stopping the reception, that is, the carrier sense, after 6.0 µs has elapsed since the reception of the DATA1. Therefore, without being on standby for the transmission of the ACK1 after detecting the retransmitted DATA1 as a result of the carrier sense, the responder transmits the ACK1 to the initiator after 7.0 µs passes. Consequently, the ACK1 and the retransmitted DATA1 collide, and frame exchange between the initiator and responder fails.

Where alteration is allowed to a set for an inter frame space at the time of response frame transmission as well, it is necessary to take account of at least one frame exchange failure if altering a set from a short inter frame space to a long inter frame space.

In view of this, in the second embodiment, the initiator and responder use the first set for an inter frame space when establishing a connection; if one of the wireless communication apparatuses determines, after establishment of a connection, to use the second set for an inter frame space, information that the second set will be used is added to a data or management frame to be transmitted after accessing using the second set. As for this information, for example, the transmission and reception processing unit 206 prepares the frame header of the data or management frame for 1 bit (hereinafter referred to as a notice bit). If "0", the first set is used, and if "1", the second set is used. The wireless communication apparatus that has received this data frame determines, from the notice bit, which of the sets for an inter frame space is used by the wireless communication apparatus of the communication partner; and adjusts its set to match the partner's set for an inter frame space.

An example of a frame exchange between wireless communication apparatuses according to the second embodiment will now be described with reference to FIG. 6.

The upper side shows the operating sequence of an initiator, and the lower side, the operating sequence of a responder.

In step S601, using the regular inter frame space of the first set, the initiator transmits DATA1 to a responder after InitIFS passes; and the responder transmits ACK1 to the initiator after SIFS1 elapses. Here, since the initiator uses the first set of inter frame space, a notice bit (which indicates the inter frame space set) in the DATA1, is set to "0."

In step S602, using the second set of inter frame space, the initiator transmits DATA2 to the responder after InitIFS_C passes. Here, since the initiator uses the second set of inter frame space, the notice bit indicating the set for the inter frame space is set to "1."

In step S603, when the responder receives the DATA2 and extracts the notice bit from the DATA2, it will grasp that the value is set to "1." The responder consequently uses the second set of inter frame space. Subsequently, the responder transmits ACK1 to the initiator after SIFS_C passes.

Figure 6:
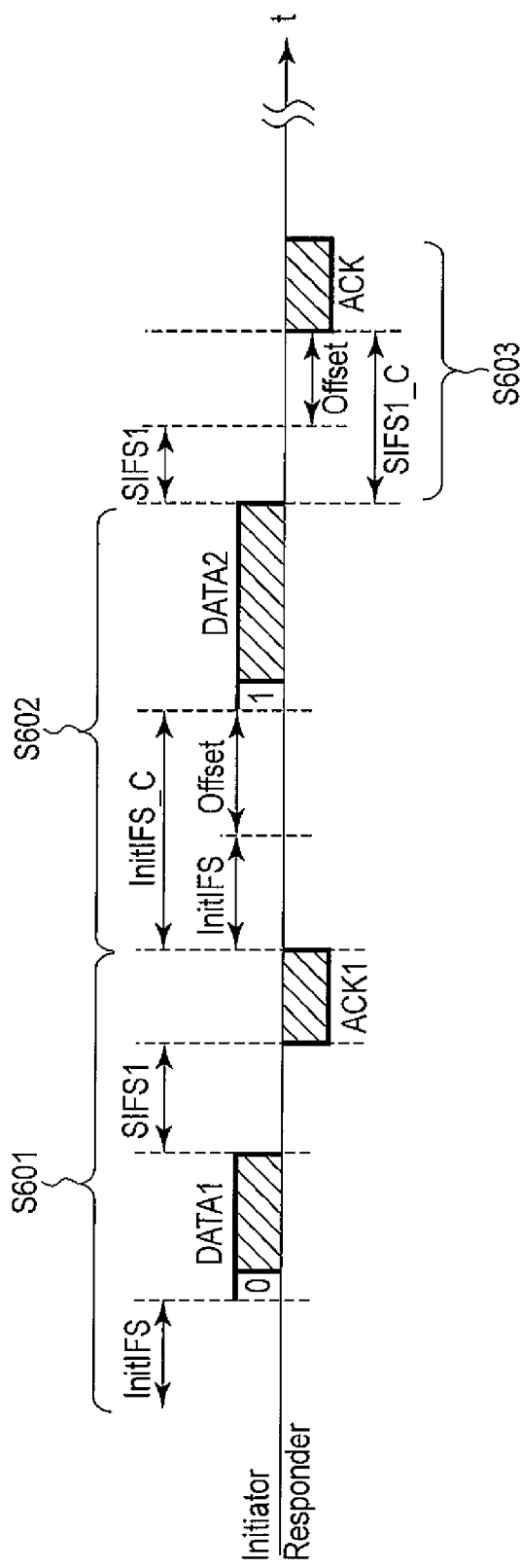
FIG. 6 illustrates an example of frame exchanges by wireless communication apparatuses according to the second embodiment.

As shown in FIG. 6, it is desirable to use the SIFS1_C of the second set from the point when a response frame is transmitted to the initiator. However, there may be a case where even if the contents of the data or management frame (i.e., a notice bit concerning a frame set, especially here) are analyzed, it may be difficult to switch between SIFS1 and SIFS1_C immediately. Immediate handling is especially difficult when changing from a long set (the second set) to a short set (the first set).

In this case, in a frame exchange including notice of switching an initial set, the inter frame space set immediately before the initial one is used, and a new set may be used following the subsequent frame exchange. As described above in terms of the response frame, for example, a notice bit may be prepared for a frame header, and the inter frame space set to be used may be notified of.

In this way, the wireless communication apparatus on the data and management frame transmission side can grasp that the wireless communication apparatus on the reception side has recognized the alteration of the inter frame space even if a response time has not yet been updated. Therefore, the updated inter frame space set can henceforward be used in the frame exchange. Moreover, the notice bit concerning the inter frame space set is always used for subsequent frame exchanges as well. Thereby, while both the wireless communication apparatuses check the sets of inter frame spaces one after another, they can be operated using the same set of inter frame spaces.

A description of an operation has been given using an example where the initiator and responder use the first set at the initiation of communication once connection is established. However, the inter frame space may be adjusted after connection is established. For example, it is assumed that one of two wireless communication apparatuses (initiator and responder have not yet been determined since a connection has not yet been established) chooses to use the second set, which has a long inter frame space, in the course of examining the other wireless communication apparatus which is its communication partner. Here, for convenience, the wireless communication apparatus that transmits a connection request frame is referred to as the first wireless communication apparatus, and the wireless communication apparatus that receives the connection request frame and transmits a connection acceptance frame is referred to as the second wireless communication apparatus.

Where the first wireless communication apparatus transmits a connection request frame to the second wireless communication apparatus, a notice bit for notifying the set of an inter frame space to be used may be set at the header of the connection request frame, in the same manner as the above-described case where the connection has already been established, and the second communication apparatus may be notified by the notice bit that the second set will be used. When the second wireless communication apparatus that has received the connection request frame accepts this notice, a similar notice bit is set at the header of the connection acceptance frame in order to use the second set to match the second wireless communication apparatus with the first wireless communication apparatus that has transmitted the connection request frame. Then, the first wireless communication apparatus is notified that the second set of inter frame space will be used. When the first wireless communication apparatus permits connection with the second wireless communication apparatus that has transmitted the connection acceptance frame, an acknowledgment frame to the connection acceptance frame is transmitted to the second wireless communication apparatus. Therefore, a notice bit is set at the header of the acknowledgement response frame as well, and this acknowledgement frame is transmitted to the second wireless communication apparatus for the purpose of reconfirmation, thereby notifying the second wireless communication apparatus that the second set of inter frame space will be used.

On the other hand, the connection request frame received by the second wireless communication apparatus still posits the first set, which is the default. However, if the second wireless communication apparatus chooses to use the second set, a notice of a determination bit is set at the connection acceptance frame header to be returned to the connection request frame. Thus, the second wireless communication apparatus is able to notify the first wireless communication apparatus that the second set will be used. Thereafter, if the first wireless communication apparatus permits connection with the second wireless communication apparatus that transmitted the connection acceptance frame, an acknowledgment frame to the connection acceptance frame is transmitted to the second wireless communication apparatus, as described above. Therefore, using a notice bit set at an acknowledgement response frame header, the first wireless communication apparatus notifies the second wireless communication apparatus that the first one will use the second set of inter frame space to match it with the second set that has transmitted the connection acceptance frame.

In this way, if one of two wireless communication apparatuses determines, before the establishment of a connection, that it should use a set with a long inter frame space, the other wireless communication apparatus as the connection target can be notified of the determination by the procedure for connection establishment. Accordingly, using the same set of inter frame spaces, the wireless communication apparatuses may carry out a frame exchange immediately after establishment of a connection.

Incidentally, a point-to-point near field communication demands that establishment of a connection should be completed in the shortest possible time. As described above, compared to the IEEE802.11 wireless LAN assumed as another system, there are very few frames transmitted in the connection establishment procedure. Therefore, there is very little interference with another system at the time of establishing a connection. Moreover, as described above, transmission and reception of an acknowledgement response frame is carried out within a short fixed time, whereas the performance of a retransmitting process is dependent on the expected time of reception. For these reasons, it is desirable to use the first set of inter frame space, which is regular, as the inter frame space for use in the connection establishment procedure.

According to the second embodiment described above, during frame transmission and reception, a bit indicating the alteration of the inter frame space is included in a frame to be transmitted. Thereby both wireless communication apparatuses can recognize the inter frame space set to be used between them, and can communicate stably while dynamically altering sets of inter frame spaces.

Third Embodiment

In the first and second embodiments, the second set of inter frame spaces use predetermined values. However, the third embodiment differs from the first and second embodiments in that the values of the second set of inter frame spaces can also be set at the time when a connection is established.

That is, the values of arbitrary inter frame spaces are set in a connection request frame or connection acceptance frame, which is a management frame used at the time of connection establishment. For example, by enabling the values of the second set of inter frame space to be added in a frame body, the value of each inter frame space specifically used as the second set can be set arbitrarily at the time of establishing connection.

In addition, if there are two or more candidates for an assumed other system, a set for a inter frame space to be adjusted is prepared for each candidate system, and a required set may be used according to the candidate system. Specifically, for example, a set for an inter frame space to be adjusted for each candidate system is prepared in a parameter storage 204, and when an interfering system is specified by the parameter selection unit 205, a predetermined set for it may be selected and used. If there are two or more other systems, a notice bit of one bit, explained in the second embodiment, does not contain sufficient information. Therefore, a notice field that enables all candidate sets to be expressed may be provided.

In the foregoing third embodiment, referring to information about the values of inter frame spaces enable the use of an arbitrary inter frame spaces. Moreover, where there are candidates for a system other than the point-to-point near field communication, inter frame spaces corresponding to each system can be set, thus enabling greater flexibility in sharing the medium.

Fourth Embodiment

In the first and second embodiments, an offset is added to all the inter frame spaces used in frame exchanges. Therefore, if the same set of inter frame spaces is not used between the wireless communication apparatuses connected with each other at the time of transmitting and receiving a response frame, appropriate frame transmission and reception cannot be performed. The fourth embodiment differs from the foregoing embodiments in that an offset is added only to inter frame spaces used for access to the wireless medium at the time of initiation of a frame exchange.

The wireless communication apparatus according to the fourth embodiment is identical in configuration to the wireless communication apparatus 200 according to the first embodiment, but differs from it in terms of sets stored in the parameter storage 204.

The parameter storage 204 stores the first set (InitIFS, RspIFS, and SIFS1), and the second set (InitIFS_C, RspIFS_C, and SIFS1).

Next, an example of a frame exchange in the wireless communication apparatuses according to the fourth embodiment will be described with reference to FIGS. 7 and 8.

FIG. 7 illustrates a case where an initiator is assumed to make access and to transmit DATA1 to the responder. The upper side shows the operating sequence of the initiator, and the lower side, the operating sequence of a responder.

In step S701, it is assumed that the initiator has used a long inter frame space (the second set) in order to avoid interference, as in the first embodiment. Then, instead of using the regular InitIFS (3 µs), but using, for example, InitIFS_C (8 µs), in which an offset period of 5 µs is added to InitIFS so that the result of the addition equals PIFS (8 µs) in the other system, the initiator stands by until this InitIFS_C passes.

In step S702, the initiator transmits DATA1 to the responder after the InitIFS_C passes.

In step S703, with regard to the inter frame spaces used in the frame exchanges, an offset period is not added but the SIFS1 for regular use is used as it is. Therefore, when receiving the DATA1, the responder transmits ACK1 to the initiator after the passage of the SIFS1 since the point in time that the reception of the DATA1 finishes.

Figure 8:
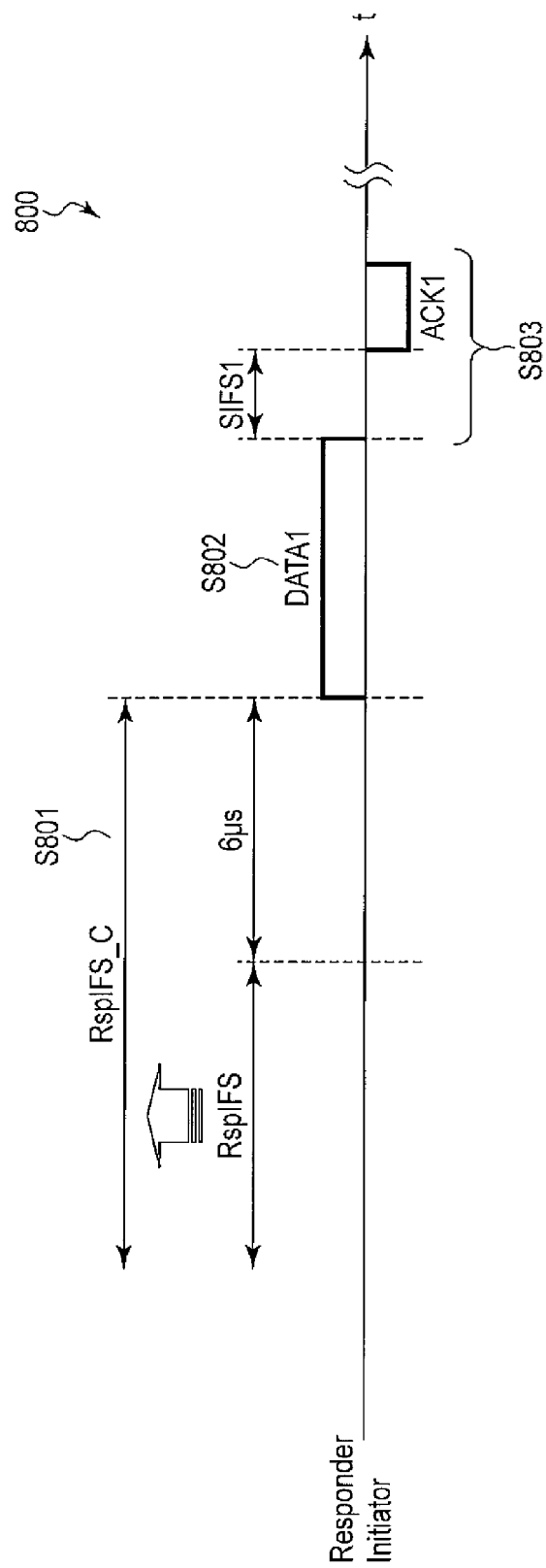
FIG. 8 illustrates an example of frame exchange by the wireless communication apparatuses according to the fourth embodiment where data is transmitted from a responder.

FIG. 8 shows the case where the responder accesses and transmits DATA1. The upper side shows the transmission frame of a responder and the lower side, the transmission frame of the initiator.

In step S801, the responder sets an inter frame space that becomes equal to the minimum value in the default of the inter frame space AIFS used in a contention period in the other system, i.e., 13 µs (which is a default value in AC_VI and AC_VO). Specifically, using RspIFS_C (13 µs), in which an offset period of 6 µs is added to the regular RspIFS (7 µs), the responder stands by until this RspIFS_C passes. Thus, the inter frame space at the time of access used by the responder is also able to match the inter frame space in the other system.

In step S802, the responder transmits the DATA1 to the initiator after the RspIFS_C elapses.

In step S803, with regard to the inter frame space used in a frame exchange, the initiator transmits ACK1 to the responder after the passage of SIFS1, using the value as it is, as shown in FIG. 8.

FIGS. 7 and 8 show the examples where the initiator and the responder match their respective inter frame spaces for access with the PIFS of the other system and the AIFS smallest in default, respectively. However, a combination of the inter frame spaces of another system is not limited to this, and the initiator and responder may match the smallest and second smallest AIFS in the default, respectively.

As described above, frame transmission and reception can be carried out between wireless communication apparatuses even if they differ from each other in the inter frame space set used at the time of frame exchange. For example, it is assumed that the wireless communication apparatus that has determined earlier to alter an inter frame space in order to coexist with the other system serves as initiator.

The initiator accesses a responder when InitIFS_C (8 μs) passes, as shown in FIG. 7. On the other hand, at this time, the responder has not yet determined whether to alter an inter frame space. Therefore, the responder accesses the initiator when the regular RspIFS (7 μs) passes. In this case, the responder can access preferentially with respect to the initiator. However, in a point-to-point near field communication apparatus, if one of the wireless communication apparatuses (in this case, the initiator) determines that this apparatus and the other system interfere with each other, then as a matter of course, the other wireless communication apparatus (in this case, the responder) is assumed to be in the same situation. Therefore, if the wireless communication apparatus is able to make an appropriate switching determination for each inter frame space to be used, the other wireless communication apparatus is also able to make a switching determination for the inter frame space within a fixed period. Therefore, in the example described above, it is assumed that the responder also determines to use the RspIFS_C, and accesses as shown in FIG. 8. Accordingly, the power relation between the initiator and responder is eventually held in terms of access opportunity.

In addition, as described in the second embodiment, one of the wireless communication apparatuses may insert information about an inter frame space to be used (i.e., the first set or second set, that is, whether a regular inter frame space or the inter frame space is adjusted for coexistence) into, for example, a frame header, thereby notifying its communication partner's wireless communication apparatus of the information.

Figure 9:
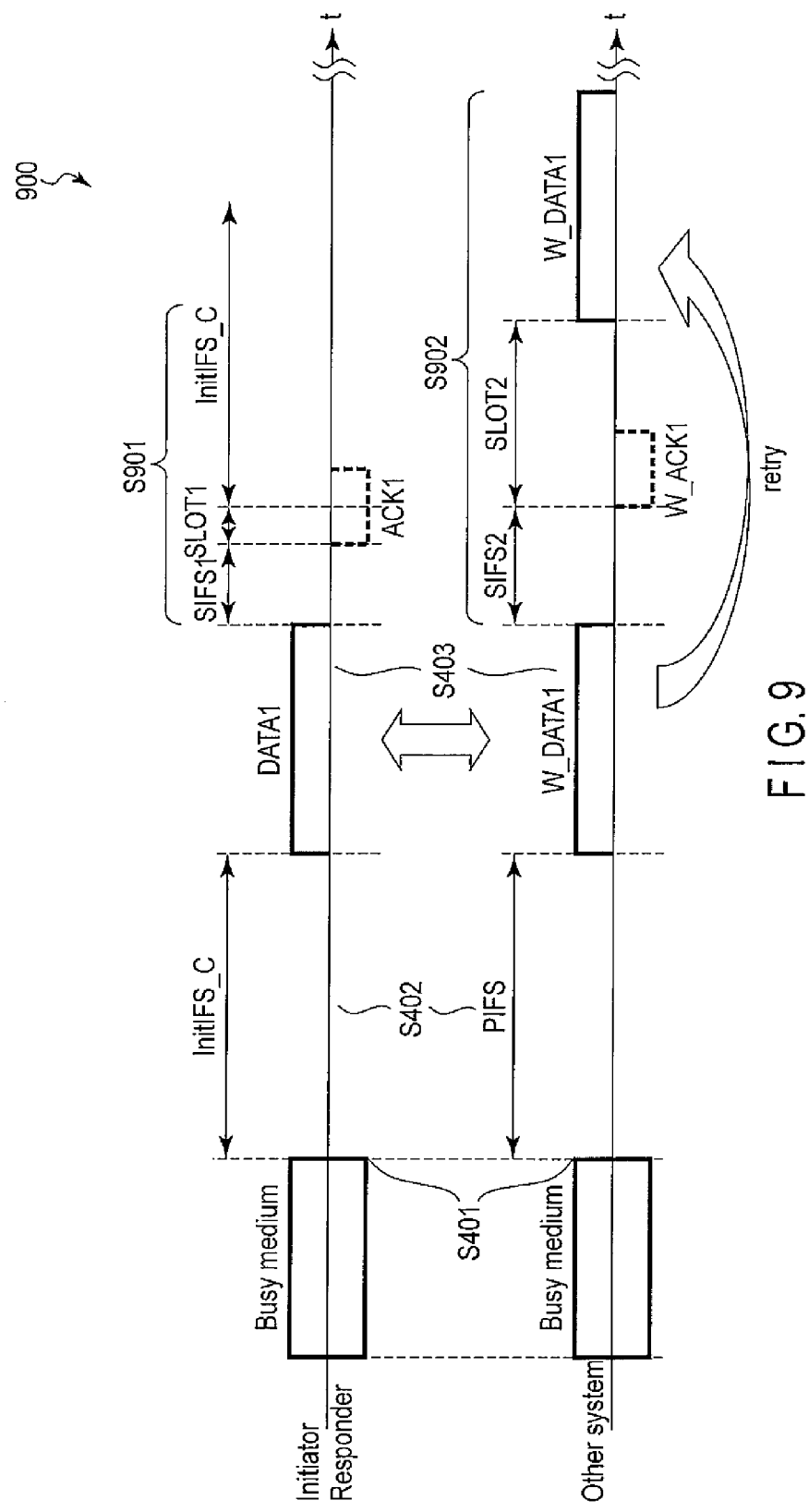
FIG. 9 illustrates an example of an operation where the wireless communication apparatuses in a point-to-point near field communication system according to the fourth embodiment and a wireless communication apparatus in another system coexist.

Referring to FIG. 9, next will be described an operation in which a wireless communication apparatus of the point-to-point near field communication system according the fourth embodiment coexists with a wireless communication apparatus of another system. In this case, for example, it is assumed that an initiator matches an inter frame space PIFS when performing preferential transmission in the other system.

Since the processing from step S401 to step S403 is the same as that in FIG. 4, the explanation thereof here is omitted.

In step S901, once a period of SIFS1 (2 μs)+SLOT1 (1 μs) has elapsed since transmission of the DATA1, the initiator determines that ACK1 has not been transmitted, and tries to retransmit the DATA1 after providing an idling period of InitIFS_C (8 μs).

However, in step S902, the wireless communication apparatus of the other system retransmits W_DATA1 after a period of SIFS2 (3 μs)+SLOT2 (5 μs) has elapsed since the transmission of the W_DATA1, as in FIG. 4 in the first embodiment.

Therefore, the initiator detects the signal of the W_DATA1 as a result of the carrier sense, and postpones the retransmission of the DATA1. As in the first embodiment, the initiator and the other system using the preferential inter frame space (PIFS) have equal opportunity for first access to a medium. However, in a recovery operation (i.e., retransmission), the other system is overwhelmingly advantaged.

On the other hand, it is assumed that the responder adjusts the inter frame space for access so that this inter frame space becomes equivalent to the minimum value (13 μs) in the default of the inter frame space AIFS used for a contention period in the other system. In the other system, a random back off period is additionally provided after the AIFS. During these periods, the wireless apparatus of the other systems cannot accesses unless the carrier is sensed to be idling. Therefore, the responder has equal access time to the wireless apparatus of the other system that uses the AIFS for an inter frame space for access with respect to the other system. However, the responder does not have a random back off period and, accordingly, is advantaged stochastically. This is the same even where a comparison is made in terms of a retransmission process. In fact, the responder is overwhelmingly disadvantaged with respect to access using preferential PIFS in the other system. Therefore, a medium can be shared equally between the point-to-point near field communication system and the other system.

If the initiator and the responder set their respective inter frame spaces such that they match the smallest and second smallest AIFSs in default in the other system, respectively, both the initiator and responder are overwhelmingly disadvantaged with respect to the wireless apparatus that uses preferential PIFS in other systems. However, the initiator is stochastically advantaged with respect to a wireless apparatus that operates in a contention period in the other system, and the responder is also somewhat advantaged since it does not have a random back off period.

In the fourth embodiment described above, an offset is added only to inter frame spaces used at the time of access to a wireless medium during initiation of frame exchanges, and the inter frame spaces for the frame exchanges are made equal in length to a regular inter frame space. Thereby, a medium can be equally shared between a point-to-point near field communication system and another system.

Fifth Embodiment

In a point-to-point near field communication system, there is no random back off. Therefore, even when using an inter frame space equal to a fixed-length inter frame space used in another system at the time of access to the medium, the wireless communication apparatus in the point-to-point near field communication system is stochastically advantaged in frame transmission. Therefore, in the fifth embodiment, in addition to adjusting an inter frame space such that the inter frame space is made equal to any of inter frame spaces used in a contention period in another system, an average random back off period in the other system is set. Thereby, fair access opportunity in which the random back off period in the other system is taken into account can be achieved.

Next, an example of a frame exchange in a wireless communication apparatus according to the fifth embodiment will be described with reference to FIGS. 10 and 11.

FIG. 10 illustrates a case where an initiator accesses and transmits DATA1 to a responder. The upper side shows the operating sequence of the initiator, and the lower side shows the operating sequence of the responder.

It is assumed that, taking interference with another system into consideration, the initiator determines that it is better for the initiator to use a long inter frame space. At this time, InitIFS_C is defined by adding to the regular InitIFS an offset period of 5 μs used for making an inter frame space equal to the period of the PIFS in the other system (also called the first offset period) and a period in which the random back off in the other system is assumed (also called the second offset period). In the example in FIG. 10, the second offset period is assumed to be the period of a half of the time of the minimum Contention Window (CW) in the default in the other system. For example, in the IEEE802.11 wireless LAN system, the default value of the CW is a minimum of 3 in CWmin in AC_VO. When transmitting a data frame categorized as the AC_VO, a wireless communication apparatus in the other system will wait for the time calculated by multiplying the random number between 0 and 3 and a slot time (SLOT 2). Therefore, the average of the random numbers in the AC_VO is 3/2=1.5, and 7.5 µs in which this (i.e., 1.5) is multiplied by the time of SLOT 2 (5 µs) resulting in the average random back off time. That is, the computed value is the value of half the CW time (3×5=15 µs) and, in the fifth embodiment, 7.5 µs (mentioned above) is the second offset period, and InitIFS_C is defined as 15.5 µs.

Since communication between the initiator and responder thereafter is the same as that in the fourth embodiment, the explanation thereof is omitted here.

Next, referring to FIG. 11, a description is given of the case where the responder accesses and transmits DATA1 to the initiator. In FIG. 11, the upper side shows the operating sequence of the responder, and the lower side, the operating sequence of the initiator.

As in the fourth embodiment, the responder adds to RspIFS (7 µs) an offset period of 6 µs (the first offset period) so that the inter frame space becomes equal to an AIFS that is the minimum value in the default value in the other system, and also the second offset period 7.5 µs, in the same manner as described above. Therefore, RspIFS_C equals 20.5 µs. Since communication between the initiator and responder thereafter is the same as that in the fourth embodiment, the explanation thereof is omitted here.

As shown in FIGS. 10 and 11, the initiator can also be disadvantaged at the time of initial access with respect to preferential access by the other system. Additionally, with regard to access by AC_VO and AC_VI during a contention period in the other system, the AIFS in the other system has a default value of 13 µs. Therefore, InitIFS_C (15.5 µs) may lose stochastically. On the other hand, the responder is disadvantaged with respect to preferential access by the other system, and also disadvantaged with respect to access by the AC_VO and AC_VI in the contention period in the other system at a default value level. Moreover, the responder is advantaged to some degree stochastically with respect to AC_BE and AC_BK.

A description was given above using an example where the value of a half of the CW time corresponding to the default CWmin of the AC_VO in another system is added. However, the embodiment is not limited to this, and a CW time corresponding to another inter frame space may be used. For example, in a responder, values of a half of the CW time (7×5=35 is) corresponding to the default CWmin of the AC_VI, that is 17.5 µs, may be used as the second offset period and added to the RspIFS. In this way, the initiator and responder may be further distinguished by an offset time in which random back off is assumed.

Although FIGS. 10 and 11 show the technique of adding an offset time to the fourth embodiment in which random back off in the other system is assumed, this does not limit the embodiment. For example, as in the first embodiment, after a fixed-length offset is added to each of all inter frame spaces so that each becomes equal to the inter frame space in the other system, an offset time in which random back off in the other system is assumed may be further added to an inter frame space used at the time of access.

In the fifth embodiment described above, by further adding an offset period in which random back off is assumed to the inter frame space in a point-to-point near field communication system, a further degree of fairness in the sharing of the medium can be achieved with respect to another system that has random back off.

Sixth Embodiment

By adjusting an inter frame space longer at the wireless communication apparatus in the point-to-point near field communication system, the situation is made easier to yield access right to the wireless medium to a wireless communication apparatus in another system. However, depending on the wireless apparatus in another system, specifically depending on the access category of a frame to be transmitted, such a situation may occur in which, as long as a frame transmission request in a wireless communication apparatus of the point-to-point near field communication apparatus continues to be generated, a wireless apparatus in another system will be unable to transmit a frame. In the sixth embodiment, therefore, if access right is continuous for a certain period after once being acquired, trial of access is once temporarily stopped. In this way, a wireless communication apparatus in another communication system can be also guaranteed to obtain transmission opportunities.

A wireless communication apparatus according to the sixth embodiment is similar to the wireless communication apparatus shown in FIG. 1 in configuration, but different from it in operation of the transmission and reception processing unit 206 and parameter selection unit 205.

The transmission and reception processing unit 206 measures the period for which access right is continuously available (hereafter called a continuation period) after its own apparatus once acquires the access right. When a continuation period becomes equal to or greater than a threshold value (here, a period of T_burst), the parameter selection unit 205 is notified thereof.

The parameter selection unit 205 selects an inter frame space (T_pause) used for stopping access trial for a fixed period. Based on the inter frame space received from the parameter selection unit 205, the transmission and reception processing unit 206 adds the fixed period (T_pause) to an inter frame space, and stops frame transmission.

Next, an example of a frame exchange in a wireless communication apparatus according to the sixth embodiment will be described with reference to FIG. 12.

In FIG. 12, the upper side shows the operating sequence of an initiator, the lower side, the operating sequence of a responder. With regard to the responder transmitting a data frame, InitIFS_C shown in FIG. 12 is replaced by RspIFS_C, and the same processing may be performed by the responder.

Specifically, a continuation period 1201 in the case of the initiator refers to the period taken to sense that a carrier is busy during standby for a period of InitIFS_C after reception of a response frame from the responder wherefrom access right is first acquired during the InitIFS_C. That is, it is assumed that the period of time for which, after reception of a response frame from the responder, access right can be continued during the InitIFS_C is a continuation period.

As shown in FIG. 12, after InitIFS_C passes, the initiator acquires access right and transmits DATA1 to the responder. The responder receives DATA1 and replies by transmitting ACK1 to the initiator. This process continues, and the initiator transmits DATA n to the responder after InitIFS_C passes. At this time, if a frame transmission process in a point-to-point near field communication system exceeds a fixed period (T_burst), the initiator stands by for a fixed period (T_pause) after the reception of ACKn from the responder, until the next access trial.

Incidentally, there is a method in which if no frame exchange takes place for a certain period in a point-to-point near field communication system, a frame for checking whether a communication partner's wireless communication apparatus still exists or not is transmitted, and, if there is no response, the connection is cut. This period is referred to as T_keepalive. If a point-to-point near field communication system uses this method, it is necessary to make the period T_pause shorter than the period T_keepalive used for existence check.

The initiator's or responder's timing of shifting to a period of T_pause after the passage of a period of T_burst may be the time when a frame is transmitted and then a response frame to this transmitted frame is received, or may be the time when there is no response frame within the fixed period provided for checking existence of a response frame. The timing of an access trial by the initiator after a period of T_burst passes may be after the passage of a period of T_pause+InitIFS_C.

This period of T_pause+InitIFS_C may be defined as InitIFS_C_S.

In a first set for regular use in a parameter storage 204, both an inter frame space for access in the beginning of a continuation period and an inter frame space for access during a continuation period have the same value. For example, the initiator stores InitIFS, and the responder stores RspIFS. In a second set for dealing with coexistence with another system, InitIFS_C and InitIFS_C_S may be stored for an initiator, and RspIFS_C and RspIFS_C_S (T_pause+RspIFS_C) may be stored for responders. As a value for the T_pause, the value of the average random back off period in another system may be used.

In the foregoing example, a period of T_pause is also regarded as one classification of the inter frame space, and it is assumed that a carrier sense is performed during the period of T_pause. However, the T_pause may be considered as a mere pause in access period. In this case, the carrier sense is not performed during the period of T_pause, but may be performed from the time of access is acquired after that. Moreover, at this time, it is not necessary to store a value equivalent to the T_pause into a set used for the inter frame space stored in a parameter storage 204. For example, if a transmission and reception processing unit 206 has been notified by the parameter selection unit 205 of use of a second set, the transmission and reception processing unit 206 may measure the continuation period and, if the continuation period is equal to or longer than the T_burst, stand by until the period of T_pause passes.

It is also assumed in this case that a continuation period expires when an error occurs, for example. However, in a point-to-point near field communication system, if a wireless signal can be determined as sensing that a carrier is busy, it may be assumed that the continuation period has been uninterrupted. The case where it can be determined that sensing that a carrier is busy refers to, for example, the case where a wireless signal is received and the preamble of a PHY packet can be detected correctly.

A description has been given using an example in which an initiator and responder each determine and manage a continuation period. However, by enabling a continuation period to be continued when a wireless signal can be determined (within a point-to-point near field communication system as described above) as sensing that a carrier is busy, a continuation period for the entire point-to-point near field communication system can be managed and controlled. Accordingly, a medium can be equally shared between the systems.

In the sixth embodiment described above, if a wireless communication apparatus has continuous access right for a certain period of time, access trial is once stopped temporarily, thereby enabling wireless apparatuses in other communication systems to be guaranteed to obtain transmission opportunities. Accordingly, equal sharing of access to the medium can be achieved.

Seventh Embodiment

The seventh embodiment differs from the preceding embodiments in that the set for inter frame spaces to be used is switched according to a period.

FIG. 13 shows an example of switching the set for inter frame spaces in a wireless communication apparatus according to the seventh embodiment.

Each of the initiator and the responder alternately sets for each fixed period of time the first set of inter frame spaces for regular use and the second set of inter frame spaces for coexistence with another system while communicating with each other. In this embodiment, the first set is used during a period 1301 where inter frame spaces for regular use are used, and the second set is used during a period 1302 where inter frame spaces for coexistence are used.

The wireless communication apparatus according to the seventh embodiment is identical in configuration to the wireless communication apparatus according to FIG. 1 but is different from it in operation of the transmission and reception processing unit 206, parameter storage 204, and parameter selection unit 205.

The parameter storage 204 sets and stores a period T_gen and a period T_coex in order to determine termination of a period 1301 where inter frame spaces for regular use are used and termination of a period 1302 where inter frame spaces for coexistence are used, respectively.

When it is determined that coexistence with another system is required, the parameter selection part 205 instructs the transmission and reception processing unit 206 to carry out time management of T_gen and T_coex.

Referring to the inter frame spaces in the first or second set in the parameter storage 204, the transmission and reception processing unit 206 performs a frame transmission process according to the passage of the period of T_gen or T_coex.

Alternatively, when it is determined at the parameter selection unit 205 that coexistence with another system is required, time management of T_gen and T_coex is carried out at the parameter selection unit 205; and when either one of the periods of T_gen and T_coex passes, the parameter selection unit 205 may instruct the transmission and reception processing unit 206 to refer to a set of inter frame spaces in the parameter storage 204 used for the next period where different inter frame spaces are used.

In order to recognize common values for T_gen and T_coex at the initiator and responder, the T_gen and T_coex may be set as a system in advance or may be determined during connection establishment, for example. The initiator and the responder independently and dispersively manage the T_gen and T_coex, but, there are no such conditions for succeeding in continuous access by one of two, as in the continuation period in the sixth embodiment. Therefore, a period for which the inter frame spaces of the first or second set is used can be observed just internally in each of the wireless communication apparatuses.

To equally share the medium with other systems as a whole system, one notifies the other of a set of inter frame spaces used for the current frame by using the frame header. In this way, the timings of the T_gen and T_coex can be matched for the initiator and responder.

Moreover, it is assumed that the point-to-point near field communication system described above uses a technique in which if there is no frame exchange for a period T_keepalive, a probe frame is transmitted, and if there is no response to it, the connection is terminated. In this case, depending on the setting of the second set, communication using a point-to-point near field communication system may sometimes be difficult for the period 1302 where inter frame spaces for coexistence are used. Therefore, it is preferable that the period 1302 where inter frame spaces for coexistence are used be shorter than T_keepalive.

In the seventh embodiment described above, a point-to-point near field communication apparatus can achieve equal sharing of a medium with wireless communication apparatuses in other systems statistically on a time axis.

Eighth Embodiment

In the embodiments described above, a system different from a point-to-point near field communication system, for example, IEEE802.11 wireless LAN using CSMA/CA, is assumed as another system. The eighth embodiment is different from the preceding embodiments in that it assumes that another point-to-point near field communication system identical to one according to the present disclosure is present nearby and interferes with each other. The CSMA/CA senses a carrier in order to observe whether another wireless apparatus is transmitting on the medium, i.e., on a frequency channel. And if it determines as a result that another wireless apparatus is carrying out transmission, the CSMA/CA waits for a random period of time after completion of the transmission, and then starts its transmission (random access). This random access is an operation corresponding to Carrier Avoidance (CA).

In this case, if a wireless communication apparatus determines that another system is present near this apparatus and hence that the operation for coexistence is required, this apparatus performs, as in the seventh embodiment, the operation of splitting time by the period T_gen where inter frame spaces for regular use are used and the period T_coex where inter frame spaces for coexistent are used.

In this case, the other system may be such that it is determined that another point-to-point near field communication system is or is possibly present nearby. Moreover, the other system may be of any type, in which case, the eighth embodiment reverts to the seventh embodiment.

In a period where inter frame spaces for regular use are used, the eighth embodiment uses the first set of inter frame spaces, as in the first to seventh embodiments. In a period where inter frame spaces for coexistent are used, the second set described in any of the first to sixth embodiments may be used, but the second set is not limited thereto. Specifically, any second set suffices if the inter frame space used for access in the second set has disadvantage to the one in the first set, that is, has larger value than the one in the first set.

In this case, by using the second set described in any of the first to sixth embodiments, the medium can be equally shared with another system without distinguishing systems, and so regardless of whether the other system is another point-to-point near field communication system or a different type of system.

The second set is defined such that there is a minimum difference in length by making an adjustment so that the inter frame space for access is disadvantaged, that is, longer than that in the first set. For example, since a carrier cannot be sensed while switching between transmission and reception, the minimum difference is greater than the length of this time. In this way, while minimizing useless non-signal periods, a situation suitable for coexistence of point-to-point near field communication systems, that is, efficient coexistence of point-to-point near field communication systems, can be achieved.

Specifically, for example, where two point-to-point near field communication system are present in mutually interacting regions, the differences between the inter frame spaces for access may be made so as to incorporate the following four steps: an initiator that transmits within T_gen is the highest in priority, a responder that transmits within T_gen, second the highest, an initiator that transmits within T_coex, third the highest, and a responder that transmits within T_coex, the lowest. Alternatively, the differences between the inter frame spaces for access may be made such that they incorporate the following four steps: an initiator that transmits within T_gen is the highest in priority, an initiator that transmits within T_coex, the second highest, a responder that transmits within T_gen, the third highest, and a responder that transmits within T_coex, the lowest.

According to above the eighth embodiment, wireless apparatuses operate by independently and dispersively switching between T_gen and T_coex, thereby making it possible to equally share a medium with a wireless apparatus in another system statistically on a time axis. Furthermore, if a wireless communication apparatus notifies another in the same system of the set inter frame spaces being used in the current frame, the timings of T_gen and T_coex can be matched for the initiator and responder, and thereby the medium can be equally shared with another point-to-point near field communication system as a whole system.

Ninth Embodiment

In the embodiments described above, it is assumed that a point-to-point near field communication system carries out CSMA but does not carry out Carrier Avoidance at least after connection establishment. In the ninth embodiment, a point-to-point near field communication system does not carry out Carrier Avoidance at the time of a regular operation in which fair sharing of the medium with another system is not taken into account, but does carry out Carrier Avoidance when another system interferes with the communication system. Carrier Avoidance may be performed by, for example, the same operation as random access in IEEE802.11 wireless LAN.

A wireless communication apparatus according to the ninth embodiment is identical in configuration to that in FIG. 1 but differs from it in operation at the parameter storage 204 and transmission and reception processing unit 206.

The parameter storage 204 stores only a first set.

If a transmission and reception processing unit 206 is notified by a parameter selection unit 205 that coexistence with another system is required, the transmission and reception processing unit 206 senses a carrier at the time of access only for the period of time given by summing an inter frame space (InitIFS or RspIFS) used for access by the first set, the value resulting from multiplying the slot time (Slot 1) of the first set, and a value generated by a random function.

For operation in the case where it is sensed that a carrier is busy, an operation in the existing system using random access may be referred to. If random access is carried out by frame transmission at the time of establishing a connection, a random function used at that time is utilized, and the detailed operation for random access may use the method adopted for connection. If the transmission and reception processing unit 206 is not notified of a requirement for coexistence with another system, only the first set is used as in the first to ninth embodiments.

Additionally, the generation width of a random value (i.e., what number from zero is returned in a random function) is slightly restricted. Thereby, coexistence between point-to-point near field communication systems can be optimized.

Additionally, the parameter storage 204 stores a second set as well. For example, in a second set, an inter frame space for access is made longer (InitIFS_C, RspIFS_C) than in the first set, taking the assumption of another system into consideration. Furthermore, the slot period is also lengthened (Slot1_C). In this condition, if a command to coexist with another system is given, the second set is used; and at the time of access, sensing of a carrier is undertaken only for the period of time to which the value in which a value generated by the random function is multiplied by the slot period (Slot1_C) has been added. Thereby the medium can be fairly shared with a system of a different type.

According to the ninth embodiment, carrying out CSMA/CA enables the medium to be fairly shared with a wireless apparatus in another system, as in the embodiments described above.

Tenth Embodiment

The tenth embodiment includes a buffer in addition to the configuration of a wireless communication apparatus shown in FIG. 2. Thus, a configuration in which a buffer is included in a wireless communication apparatus enables a transmission and reception frame to be held by the buffer. As a result, retransmitting and external output processes are facilitated.

Eleventh Embodiment

The eleventh embodiment includes a bus, processor, and external interface, in addition to a configuration of a wireless communication apparatus according to the tenth embodiment. The processor and external interface units are connected with a buffer via a bus. Firmware operates in the processor. Thus, a configuration in which firmware is included in a wireless communication apparatus facilitates modification of wireless communication apparatus function by rewriting the firmware.

Twelfth Embodiment

The twelfth embodiment includes a clock generating unit in addition to the configuration of a wireless communication apparatus shown in FIG. 2. The clock generating unit generates a clock and outputs a clock to the outside of the wireless communication apparatus via an output terminal. Thus, a clock generated in the wireless communication apparatus together with a host is operated by the clock output to the outside, thereby enabling synchronous operation of the host and wireless communication apparatus.

Thirteenth Embodiment

The thirteenth embodiment includes a power-source unit, power-source control unit, and wireless electric-power supply unit in addition to the configuration of a wireless communication apparatus shown in FIG. 2. The power-source control unit is connected to the power-source unit and wireless electric-power supply unit, and controls selection of power supplied to a wireless communication apparatus. Thus, a configuration in which a wireless communication apparatus is provided with a power source enables low-power-consumption operations in which the power source is controlled.

Fourteenth Embodiment

The fourteenth embodiment includes a Near Field Communication (NFC) transmission and reception unit in addition to a configuration of a wireless communication apparatus according to the thirteenth embodiment. The NFC transmission and reception unit is connected to a power-source control unit and a transmission and reception processing unit 206. Thus, the configuration in which the NFC transmission and reception unit is included in the wireless communication apparatus enables easy performance of an authentication process, and also enables power consumed while waiting to be reduced by controlling the power source using the NFC transmission and reception unit as a trigger.

Fifteenth Embodiment

The fifteenth embodiment includes a Subscriber Identity Module (SIM) card in addition to a wireless communication apparatus according to the thirteenth embodiment. The SIM card is connected with the transmission and reception unit 206. Thus, the configuration in which the SIM card is included in the wireless communication apparatus enables an authentication process to be easily performed.

Sixteenth Embodiment

The sixteenth embodiment includes a dynamic image compression/decompression unit in addition to a configuration of a wireless communication apparatus according to the eleventh embodiment. The dynamic image compression/decompression unit is connected to a bus. Thus, a configuration in which a dynamic image compression/decompression unit is included in a wireless communication apparatus facilitates transmission of a compressed dynamic image and decompression of a received compressed dynamic image.

Seventeenth Embodiment

The seventeenth embodiment includes an LED unit in addition to the configuration of a wireless communication apparatus shown in FIG. 2. The LED unit is connected with a transmission/connection processing unit 206 or PHY processing unit 203. Thus, a configuration in which a wireless communication apparatus is provided with an LED unit makes it easy to inform a user of the operating state of a wireless communication apparatus.

Eighteenth Embodiment

The eighteenth embodiment includes a vibrator in addition to the configuration of a wireless communication apparatus shown in FIG. 2. The vibrator is connected to a transmission and reception processing unit 206 or PHY processing unit 203. Thus, a configuration in which a wireless communication apparatus is provided with a vibrator makes it easy to inform a user of the operating state of the wireless communication apparatus.

Nineteenth Embodiment

The nineteenth embodiment includes a plurality of different PHY processing units 203 and a wireless switching unit in addition to the configuration of a wireless communication apparatus shown in FIG. 2. The wireless switching unit is connected to the different PHY processing units 203, and switches communication between the different PHY processing units 203. Thus, a configuration in which a wireless communication apparatus is provided with a plurality of different PHY processing units 203 enables switching to communication that uses the PHY processing unit appropriate to a particular situation.

Twentieth Embodiment

The twentieth embodiment includes a plurality of different PHY processing units 203, transmission and reception processing units 206 corresponding to the PHY processing units 203, and a wireless switching unit, in addition to the configuration of a wireless communication apparatus shown in FIG. 2. The wireless switching unit is connected so as to allow switching between the transmission and reception processing units 206, and hence switching between a plurality of communication systems by use of different transmission and reception processing units 206 and PHY processing units 203. One of each combination of transmission and reception processing units 206 and PHY processing units 203 corresponds to, for example, a wireless LAN. Thus, a configuration in which wireless communication apparatuses are provided with different sets of transmission and reception processing units 206 and PHY processing units 203 enables switching to communication that uses a set of transmission and reception processing units 206 and PHY processing units 203 appropriate according to a particular situation. Moreover, parameter storages 204 and parameter selection units 205 may also be provided so as to correspond to each transmission and reception processing unit 206. Thus, a configuration in which wireless communication apparatuses are provided with different sets of transmission and reception processing units 206, parameter storages 204, parameter selection units 205, and PHY processing units 203 enables switching to communication that uses a set of transmission and reception processing units 206, parameter storages 204, parameter selection units 205, and PHY processing units 203, appropriate to a particular situation.

Twenty-First Embodiment

The twenty-first embodiment includes a switch (SW) in addition to a configuration of the wireless communication apparatus according to the nineteenth embodiment. The switch is connected to an antenna 201, a plurality of different PHY processing units 203, and a wireless switching unit. Thus, a configuration in which a wireless communication apparatus is provided with a switch (SW) enables switching to communication that uses a PHY processing unit 203, appropriate to a particular situation, while sharing an antenna 201.

Twenty-Second Embodiment

The twenty-second embodiment includes a switch (SW) in addition to a configuration of the wireless communication apparatus according to the twentieth embodiment. The switch is connected to an antenna 201, transmission and reception processing unit 206, and a wireless switching unit. Thus, a configuration in which a wireless communication apparatus is provided with a switch enables switching to communication that uses a set of the transmission and reception processing unit 206 (as well as parameter storage 204 and parameter selection unit 205 in the case where these are provided so as to correspond to each transmission and reception processing unit 206) and PHY processing unit 203, each set being appropriate to a particular situation, while sharing an antenna.

Now, the communication range in a wireless communication apparatus according to the preceding embodiments will be described. A communication range is mainly determined by electric transmission power and antenna gain. When a certain wireless communication apparatus (the first wireless communication apparatus) transmits a wireless signal of arbitrary frequency by use of certain electric transmission power, this apparatus is assumed to have a transmission antenna gain that depends on direction. Additionally, the other wireless communication apparatus (the second wireless communication apparatus) that receives this wireless signal is assumed to have a reception antenna gain that depends on direction. The received power of the wireless signal in the second wireless communication apparatus at a certain distance in a certain direction depends statistically on electric transmission power, frequency, the distance between wireless communication apparatuses, the transmission antenna gain of the first wireless communication apparatus in the direction, and the reception antenna gain of the second wireless communication apparatus in the direction.

The degree of attenuation of the statistical electric power from electric transmission power can be calculated from the distance between the wireless communication apparatuses and frequency of a wireless signal. The degree of attenuation becomes larger as the frequency to be used becomes higher. Reception power can be expressed in decibel notation as the result of deducting this degree of attenuation from the sum of the electric transmission power and the transmission and reception antenna gains. The error rate at the time of decoding a wireless signal, and hence the error rate of a frame extracted from the payload of a physical (PHY) packet reproduced by decoding, is dependent on the reception power of a wireless signal. Specifically, the error rate increases as the reception power decreases, from which a range in which wireless communications can be established, that is, a communication range, is derived.

In this way, the communication range of a wireless signal of a certain frequency is limited by the electric transmission power and the transmission and reception antenna gains. In order to limit a communication range more actively, the reception power may be used to perform decoding processing only for a wireless signal that is equal to or greater than a certain value. For example, in FIG. 1, the wireless communication apparatuses 101 and 102 are restricted to 0 dBm in electric transmission power, and, for convenience of explanation, transmission and reception are carried out with a non-directional antenna (i.e., transmission and reception antenna gains are each 0 dB). Additionally, it is assumed that a 60-GHz millimeter wave belt is used, and a reception power of −48 dBm is obtained at about 3-cm distance as a result; setting can be such that decoding processing can be carried out only when wireless signal that received power is −48 dBm or greater can be received.

As a matter of course, with regard to a wireless signal with at least the reference value of reception power for performing this decoding process, it is assumed that there are one or more Modulation and Coding Schemes (MCS) for performing the decoding process. Specifically, it is assumed that there are one or more MCSs in which the minimum reception sensitivity becomes equal to or smaller than the reference value of the reception power.

Wireless signals smaller than the reference value of the reception power used for performing this decoding process are not decoded. Therefore, the reception power reference value may be recognized as a level at which a carrier is sensed. A wireless signal with at least the reception power reference value is recognized as a level at which a carrier is busy. A wireless signal smaller than the reference value may be recognized as a level at which a carrier is idle. In this way, the communication range of a wireless signal of a certain frequency may be limited by electric transmission power, transmission and reception antenna gains, and the reference value for the reception power decoding process. In other words, if a reference value for the reception power decoding process is equal to the level at which a carrier is sensed, the communication range of the wireless signal of a certain frequency may be limited by the electric transmission power, transmission and reception antenna gains, and the level at which a carrier is sensed.

Next, frame types in a general communication system will be explained.

Generally, frames dealt with on a wireless access protocol in a communication system are roughly categorized into three types: data frames, management frames, and control frames. These types are indicated by a header provided as common to all frames. As a method for displaying a frame type, these three types may be distinguished in one field, or may be distinguished by a combination of two fields.

A management frame is a frame used for management of physical communication links with other wireless communication apparatuses. Examples of management frames are frames for setting communication with other wireless communication apparatuses, frames for releasing communication links (i.e., terminating connections), and frames relating to power saving operations in wireless communication apparatuses.

A data frame is a frame that transmits data generated in a wireless communication apparatus to another wireless communication apparatus, after establishing a physical communication link with the other wireless communication apparatus. Data is generated in an upper layer in the present embodiment, for example, by user operation.

A control frame is a frame used for controlling transmission and reception (exchange) of a data frame with another wireless communication apparatus. A response frame transmitted as a delivery acknowledgement when a wireless communication apparatus receives a data frame or a management frame, falls under the category of a control frame.

These three types of frames are delivered via antennas, as physical packets through processing required in a corresponding physical layer. In the procedure for establishing a connection, a connection request frame and a connection acceptance frame are examples of management frames. As for a probe frame in respect of a connection acceptance frame, a control frame such as a response frame can be used.

Next, a method of terminating a connection between wireless communication apparatuses is explained.

There are an explicit and a suggestive method for termination of a connection. In the explicit one, either one of the connected wireless communication apparatuses transmits a frame for termination. This frame is categorized as a management frame. The termination frame may be called a release frame due to its indicating that a connection is to be released, for example. Generally, a wireless communication apparatus transmitting a release frame determines that a connection is terminated when a release frame is transmitted. A wireless communication apparatus receiving a release frame determines that a connection is terminated when a release frame is received. Thereafter, it returns to the initial state in the communication phase, for example, the state of searching for its communication partner's wireless communication apparatus. This is because, when a release frame is transmitted, the communication distance from the opposite wireless communication apparatus (i.e., a receiver) increases, resulting in an insecure physical wireless link perhaps leading to failure in reception of a wireless signal or improper decoding.

FIG. 14 illustrates physical wireless link disconnection in a point-to-point near field communication system. As shown in FIG. 14, with a communication range 1401 of a wireless communication apparatus 101 and a communication range 1402 of a wireless communication apparatus 102, neither of these apparatuses are located in the communication ranges of their communication partners. Therefore, even if each transmits a termination frame to its partner's wireless communication apparatus, an acknowledgement cannot be expected. Therefore, a wireless communication apparatus that has transmitted a release frame determines that the connection is terminated when the release frame is transmitted.

As for the suggestive method, if a frame transmission (the transmission of data and management frames, or the transmission of a frame in response to a frame that the transmitter itself has transmitted) is not detected by the wireless communication apparatus of a communication partner that has established connection for a fixed time, the transmitter determines that the connection is terminated. Such a method is required because in a situation where such disconnection is determined, the communication distance from a wireless communication apparatus of a communication partner may be so far that a physical wireless link allowing a wireless signal to be received or decoded cannot be obtained. That is, reception of a release frame cannot be expected.

A timer is used as an example for determining disconnection in the suggestive method. For example, when a data frame requiring a delivery acknowledgement response frame is transmitted, a first timer (for example, a retransmission timer for data frames) that limits the retransmission period for the data frame is started, and retransmission is carried out if the reception acknowledgement frame to be transmitted in response to this data frame is not received before the first timer finishes time measurement (i.e., before the required retransmission period passes). The first timer is stopped upon reception of the acknowledgement frame transmitted in response to this data frame.

On the other hand, if the first timer finishes time measurement without receiving a reception acknowledgement response frame, a management frame for checking whether or not its communication partner is present (in the communication range, i.e., whether a wireless link has been obtained) is transmitted. Simultaneously with this, a second timer (e.g., a retransmission timer for the management frame) for limiting the retransmission of management frames is started. If the reception acknowledgement frame to be transmitted in response to the data frame is not received before the second timer finishes time measurement, then, as with the first timer, retransmission occurs. When the second timer finishes time measurement, a determination is made that the connection is disconnected.

Alternatively, a third timer is started upon reception of a frame from a connection target's wireless communication apparatus. Each time a new frame from a connection target's wireless communication apparatus is received, the third timer is stopped and restarted from the initial value. When the third timer finishes time measurement, a management frame to check whether or not the communication partner's wireless communication apparatus is present (within the communication range, i.e., whether a wireless link has been obtained) is transmitted in the same manner as described above. Simultaneously with this, the second timer (e.g., a retransmission timer for management frames) limiting the retransmission period for the data frame is started. In this case also, retransmission occurs if a reception acknowledgement frame to be transmitted in response to this data frame is not received before the timer finishes time measurement. When the second timer finishes time measurement, a determination is made that the connection is disconnected. In the latter case, the management frame for checking whether a communication partner's wireless communication apparatus is present or not may be different from the management frame used in the former case. Moreover, although the timer for limiting retransmission of management frames used in the latter case is the same as that in the former, different timers may also be used.

Next will be described an access system in a representative point-to-point near field communication system.

In a point-to-point near field communication system, a communication partner of it is only one wireless communication apparatus after a connection is established. Additionally, the communication range is restrictedly narrow. Therefore, it rarely occurs that wireless communication apparatuses other than a communication partner are nearby and present on the same channel, that is, interference or competition between a system according to the present embodiments and a wireless communication apparatus other than its communication partner on the same wireless medium is rare. Therefore, in terms of conditions for access to the medium, a point-to-point near field communication system is different from communication systems assumed to compete or communicate with other wireless communication apparatuses.

For example, there is a wireless LAN communication system assumed to communicate or compete with a plurality of wireless communication apparatuses. In an IEEE802.11 (extension standard etc., are included) wireless LAN, an access system is set based on CSMA/CA. In the system in which transmission by a certain wireless apparatus is affirmed and transmission is carried out a fixed time after completion of the transmission by this certain wireless apparatus, a plurality of wireless apparatuses that have affirmed transmission by the certain wireless apparatus transmit simultaneously. As a result, wireless signals collide, resulting in failure in frame transmission. By detecting transmission by a certain wireless apparatus and waiting an arbitrary length of time after this transmission is over, a plurality of wireless communication apparatuses that have affirmed this transmission can be statistically spread. Therefore, if the number of wireless apparatuses choosing the earliest time in the arbitrary interval is one, this will allow frame transmission and avoid frame collision. A system in which Carrier Avoidance is adopted after acquisition of a transmission right is made fair based on random values among two or more wireless apparatuses is suitable for the sharing of the wireless medium among two or more wireless apparatuses.

In the case of a point-to-point near field communication system, before a communication partner's wireless communication apparatus is uniquely determined, that is, at the stage of connection establishment, a plurality of wireless communication apparatuses may serve as candidates for a communication partner. In that case, there may be competition for the wireless medium. However, after connection has once been established, a point-to-point near field communication system is generally less likely to interfere with other wireless communication since its communication range is limited to a narrow one. Additionally, since communication is limited to one to one, there is no connection and communication with other wireless communication apparatuses once connection is established. Therefore, a mechanism for a plurality of wireless communication apparatuses to compete on the wireless medium is fundamentally unnecessary. Moreover, random access becomes an overhead on the wireless medium, and this is not desirable from the point of communication efficiency.

Therefore, it is assumed that a point-to-point near field communication system according to the present embodiment senses a carrier as described above and gains access to the carrier, that is, carries out CSMA, but does not carry out Carrier Avoidance, at least once connection is established.

In this case, "interference" includes the act of interfering and the state of being interfered with.

In point-to-point near field communication, the communication range is narrow. Therefore, wireless apparatuses in a wireless communication system with a communication range wider than that can successfully transmit, in many cases, without detecting a wireless signal from point-to-point near field communication. However, even in such a case, it is possible that the wireless communication apparatus in the point-to-point near field communication may receive a wireless signal from the wireless communication system with wider communication range. A point-to-point near field communication system may be interfered with by other wireless communications systems, but not itself interfere with the other wireless communication systems. In such a situation, based on the carrier sense, a point-to-point near field communication system cannot carry out decoding of a PHY system used in wireless communication systems with wider communication range. However it can detect the transmission by virtue of received power. On the other hand, the wireless apparatus in the wireless communication system with wider communication range transmits a wireless signal from the point-to-point near field communication system without detecting this wireless signal. Therefore, even if an inter frame space is adjusted by a point-to-point near field communication system, the wireless medium cannot be shared. On the other hand, at the time of coexistence of a point-to-point near field communication system and a wireless communications system with wider communication range, it is necessary to share the wireless medium by use of the wireless communication apparatus according to the preceding embodiments.

Figure 15:
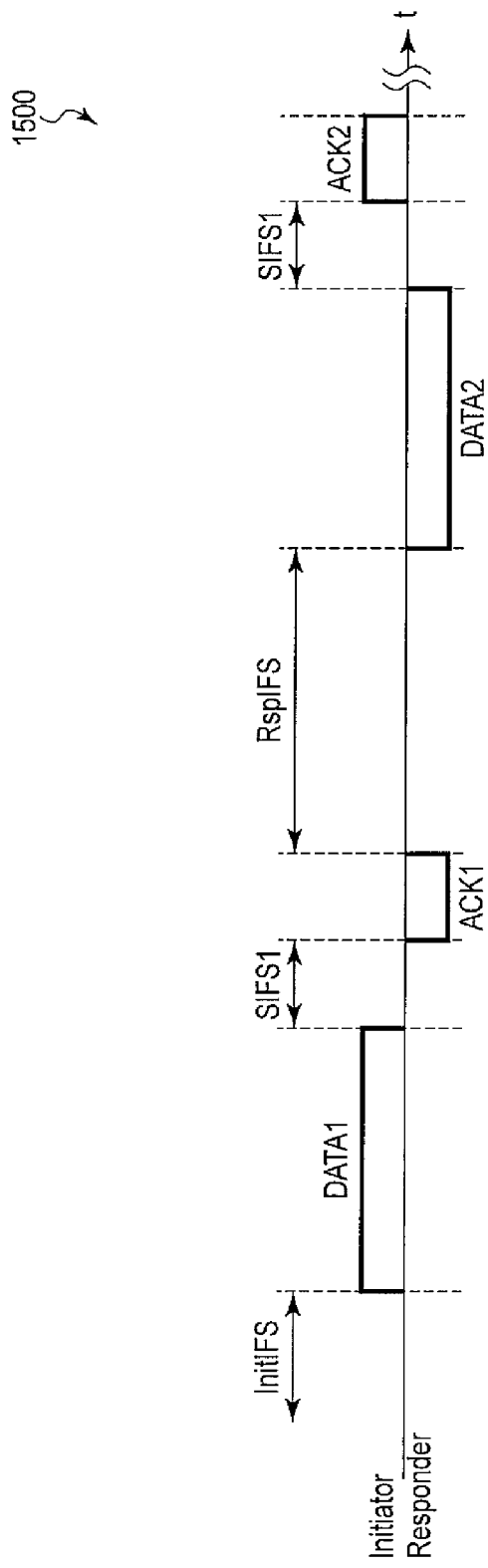
FIG. 15 illustrates an example of conventional frame exchanges in a point-to-point wireless communication system.

Next, an example of general frame exchange in a point-to-point near field communication system will be explained with reference to FIG. 15.

In this case, it is assumed that two wireless communication apparatuses compose a point-to-point near field communication system through a procedure for establishing a connection.

An initiator checks that the wireless medium is unoccupied for a period of InitIFS(s), and transmits a data frame (DATA1) to a responder.

A responder receives the DATA1 from the initiator and transmits a response frame (ACK1) to the initiator after SIFS1 passes.

In this case, if it is assumed that, for example, a request to transmit a data frame (DATA2) occurs during reception of the DATA1 by the responder, the responder then postpones transmission until the medium is unoccupied for a period of RspIFS(s). In the example shown in FIG. 15, since there is no transmission by the initiator after transmission of the ACK1, the responder transmits DATA2 to the initiator after waiting for a period of RspIFS since the transmission of the ACK1. The initiator that has received the DATA2 transmits a response frame (ACK2) to the responder after a period of SIFS1.

Minimum but no maximum values are set for the InitIFS and RspIFS. This is because if a carrier is not busy when transmission is requested, there is no limit on time since the previous busy state of the carrier, unlike in the preceding example. An inter frame space is counted from when the previous busy state of a carrier is sensed. Therefore, with regard to a continuous time to be left before transmission from sensing that a carrier is idle, InitIFS and RspIFS are 3 μs and 7 μs, respectively.

On the other hand, the maximum value is set for SIFS. This is because a transmitter of a data frame and management frame waits for reception of a response frame and, if no response frame is received, it is necessary to make the determination that, once a fixed time after transmission of the data and management frames has elapsed, indeed no response frame has been received from the other side.

If the determination is made that no response frame has been received, the wireless communication apparatus of the data and management frames performs a retransmission process. SIFS1 may be fixed, as a strictly fixed period. However, in this case, the exact time when reception of a frame finishes has to be obtained and held. In actuality, however, there may be a propagation delay or fluctuation or the like in the fitting period from reception and decryption of a wireless signal to generation of a response frame. Therefore, it is preferable to allow for a permissible degree of error.

In these inter frame spaces, there is time for switching a transmitter/receiver from a reception state for sensing a mounted carrier to a transmission state for transmitting a frame. Strictly speaking, a carrier idling state is observed only for a period resulting from subtracting the time of switching between transmission and reception (for example, the carrier sense within the period of switching between transmission and reception immediately before transmission cannot be made).

In the foregoing examples, three types of inter frame spaces are used. In addition to these, an inter frame space specific to determination of frame reception failure may be defined. For example, in transmission by an initiator and responder, in order to give transmission priority to an initiator, the minimum value of InitIFS is made smaller than the minimum value of RspIFS.

Now, if it is assumed that an initiator transmits a data or management frame but a responder fails to receive the data or management frame, an error is determined. If a timeout period for which an initiator determines that there is no response is 4.0 μs or longer after transmission of the data or management frame, the minimum time during which the initiator starts retransmission will be 7.0 μs or longer after transmission of the data or management frame. This time is equal to or longer than the period before which RspIFS is left after a responder makes a reception error. And priority cannot be given to retransmission of the initiator.

So, if a responder makes a reception error, for example, 10.0 μs ERIFS is provided, thereby ensuring retransmission priority for the initiator.

Next, the inter frame space of an IEEE802.11 wireless LAN assumed as another communication system is explained.

Below are the six types of inter frame space used by an IEEE802.11 wireless LAN: distributed coordination function inter frame space (DIFS), arbitration inter frame space (AIFS), point coordination function inter frame space (PIFS), six kinds of short inter frame space (SIFS), extended inter frame space (EIFS), and reduced inter frame space (RIFS). In order to distinguish it from SIFS in the point-to-point near field communication system according to the present embodiment, SIFS is written as SIFS2 here for clarity.

The definition of an inter frame space differs from that in a point-to-point near field communication system. In an IEEE802.11 wireless LAN, whether a "carrier is sensed to be idle" is checked before transmission and defined as a continuation period to be left, and a strict period to be left since the previous frame is not discussed. Therefore, the definition is followed by explanation of an IEEE802.11 wireless LAN system here. In an IEEE802.11 wireless LAN, the time to wait in the case of random access based on CSMA/CA is obtained from the sum of the fixed and random times, and in order to clarify a fixed time, such a definition is given.

DIFS and AIFS are inter frame spaces used for trying to start frame exchange during contention, which involves competition with other wireless communication apparatuses based on CSMA/CA. DIFS is used when there is no distinction of priority by Traffic Identifier (TID), and AIFS is used when priority by Traffic Identifier is provided.

Since operations relating to DIFS and AIFS are similar, explanation is hereinafter given mainly using AIFS. In an IEEE802.11 wireless LAN, access control including the start of frame exchange, etc. is exerted in a MAC layer. Furthermore, if QoS (Quality of Service) is specified when data is elapsed from an upper layer, traffic identification is notified together with data, and the data is classified for access priority, based on the traffic identification. A class used at the time of this access is called an Access Category (AC). Therefore, the value of AIFS is provided for each access category.

PIFS is an inter frame space that gives access priority over competing wireless communication apparatuses, and is shorter in period than both DIFS and AIFS. SIFS2 is an inter frame space that can be used for continuous frame exchange in bursts during transmission of a control frame in a response system or after an access right is once acquired. SIFS2 in an IEEE802.11 wireless LAN includes the concept of SIFS1 in a point-to-point near communication system, and since there are many frame type and frame exchange variations, it has a wide application.

EIFS is an inter frame space exercised when frame reception fails. EIFS in an IEEE802.11 wireless LAN and ERIFS in a point-to-point-near field communication system are similar. However, with regard to the connection form, a relation between initiator and responder as in a point-to-point-near field communication system is not provided in an IEEE802.11 wireless LAN. Therefore, EIFS is applied in all wireless communication apparatuses.

RIFS is an inter frame space that can be used when a plurality of frames are successively transmitted to the same wireless communication apparatus in bursts once an access right is acquired. While RIFS is in use, a response frame from a communication partner's wireless communication apparatus is not required.

In addition, a point-to-point near field wireless communication system has no inter frame space corresponding to RIFS. In a point-to-point near field wireless communication system, when wireless communication apparatuses are brought close to each other, they communicate. Therefore, while a wireless communication apparatus that serves as a communication partner is close to it, that is, during the limited connection time, they demand that they should securely complete data exchange. Therefore, without entrusting access control to an upper layer, a point-to-point near field wireless communication system takes responsibility for error control and frame control, and may aspire to high-speed processing in the wireless communication apparatuses.

In this case, data are elapsed to an upper layer from an access control layer of a wireless communication apparatus on the data reception side in the order in which the data are transmitted from an access control layer of the wireless communication apparatus on the data transmitter side. Therefore, it is necessary to transmit a frame for delivery acknowledgement in response to each data frame. Therefore, transmitting data frames in bursts as in an IEEE802.11 wireless LAN is not carried out. That is, by definition, there is no inter frame space corresponding to RIFS.

Now, an example of frame exchange in a period of competition based on the random access in an IEEE802.11 wireless LAN is shown in FIG. 16.

It is assumed that when a transmission request of a data frame (W_DATA1) occurs in a certain wireless communication apparatus, the medium is recognized as busy by virtue of a carrier being sensed. In this case, a fixed time AIFS is left from when the carrier was sensed to be idle; then, data frame W_DATA1 is transmitted to the communication partner when a random period (i.e., random backoff) has elapsed.

The random period is calculated by multiplying a slot period by a false random integer derived from the uniform distribution during a Contention Window (CW) given by an integer from 0. Here, the result of multiplying CW by the slot time is referred to as a CW time width. The initial value of CW is given by CWmin. Whenever retransmission occurs, the value of CW increases until it reaches CWmax. Both CWmin and CWmax have a value for every access category, as in the case of AIFS. If a wireless communication apparatus of the receiver of W_DATA1 succeeds in reception of a data frame, this apparatus transmits a response frame (W_ACK1) after the passage of SIFS2 from when reception is over. If a wireless communication apparatus that has transmitted the W_DATA1 receives W_ACK1 and is also within transmission burst time restrictions, it can transmit the next frame (for example, W_DATA2) after a further SIFS2.

AIFS, DIFS, PIFS, and EIFS are each a function of SIFS2 and slot period; however, SIFS2 and slot period are specified for every physical layer. Moreover, parameters the values of which are provided for every access category, such as AIFS, CWmin, or CWmax, can be set for every communication group (Basic Service Set (BSS)) for an IEEE802.11 wireless LAN). However, default values are set.

For example, in a standard formulation of 802.11ad using a millimeter wavebelt, if SIFS is 3 µs and slot time is 5 µs, it is assumed that PIFS is 8 µs; DIFS is 13 µs; for an inter frame space for an access category of Background (AC_BK) in AIFS, the default value is 38 µs; for an inter frame space for Best effort (AC_BE), the default value is 18 µs; for an inter frame space for Video (AC_VI) and Voice (AC_VO), the default value is 13 µs; default values for CWmin and CWmax are 15 and 1023 at AC_BK and AC_BE respectively; as for AC_VI, 7 and 15; and for AC_VO, 3 and 7. In addition, EIFS is the sum of the time lengths for the response frame in the case of transmission at SIFS2, DIFS, and the lowest physical rate necessary. In the present embodiment, a wireless communication system that uses parameters for such inter frame spaces is assumed as an interference system in the case of a wide communication range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication apparatus, comprising:
a storage which stores a first set and a second set, the first set including first inter frame spaces of one or more types and the second set including second inter frame spaces of the one or more types, the first inter frame spaces and the second inter frame spaces each indicating a time required before a frame can be transmitted after detecting carrier sense on a wireless medium changed from busy to idle;
a selection unit which selects either the first set or the second set in order to use for communication; and
a transmission and reception processing unit which communicates with a first apparatus using a first communication scheme, by using either the first inter frame spaces or the second inter frame spaces according to a selection result of the selection unit;
wherein when each of the second inter frame spaces are compared with each of the first inter frame spaces of a same type, a value of said each of the second inter frame spaces is equal to or larger than a value of said each of the first inter frame spaces of the same type, a value of one of the second inter frame spaces of a first type is larger than a value of one of the first inter frame spaces of the first type, and the value of one of the second inter frame spaces of the first type is determined based on a value of an inter frame space used in a second communication scheme,
wherein the first communication scheme is a scheme for transmitting and receiving data between a plurality of devices, and wherein the second communication scheme is a scheme for transmitting and receiving data between a plurality of devices.

2. The apparatus according to claim 1, wherein a sum of a first maximum transmission power and antenna gain of the first communication scheme is smaller than a sum of a second maximum transmission power and antenna gain of the second communication scheme.

3. The apparatus according to claim 2, wherein the selection unit selects the second set if an influence of a second apparatus using the second communication scheme on the first communication scheme is equal to or larger than a first threshold value.

4. The apparatus according to claim 1, wherein the value of each second inter frame space is equal to a sum of a period and the value of the first inter frame space identical in type to the second inter frame space.

5. The apparatus according to claim 1, wherein the one of the first inter frame spaces and the one of the second inter frame spaces of the first type are used for starting a medium access, and the value of one of the first inter frame spaces of a second type used for transmitting a response frame is the same as the value of one of the second inter frame spaces of the second type, the response frame indicating a response to a frame.

6. The apparatus according to claim 2, wherein the value of the one of the second inter frame spaces of the first type is equal to a sum of a value of an inter frame space in the second communication scheme and a value of half of a contention period in the second communication scheme, the contention period indicating a period of competition with other apparatuses and being selected from a range which includes at least one slot period in the second communication scheme.

7. The apparatus according to claim 1, wherein the transmission and reception processing unit measures a period for which frames are continuously transmitted after an access right to a medium is acquired, and pauses transmission of frames if a value of the period is equal to or larger than a second threshold value.

8. The apparatus according to claim 1,
wherein the selection unit sets one period for communication using the first set, and sets another period for communication using the second set, and
wherein the transmission and reception unit uses the first set for communication during the one period, and uses the second set for communication during the other period.

9. The apparatus according to claim 1,
wherein the selection unit sets one period for communication using the first set, and sets another period for communication using the second set, and
wherein if interference with a system that comprises a second apparatus that uses the first communication scheme is detected while communicating with the first apparatus, the transmission and reception processing unit uses the first set for communication during the one period, and uses the second set for communication during the other period.

10. A wireless communication method, comprising:
storing in a storage a first set and a second set, the first set including first inter frame spaces of one or more types and the second set including second inter frame spaces of the one or more types, the first inter frame spaces and the second inter frame spaces each indicating a time required before a frame can be transmitted after detecting carrier sense on a wireless medium changed from busy to idle;
selecting either the first set or the second set in order to use for communication; and
communicating with a first apparatus using a first communication scheme, by using either the first inter frame spaces or the second inter frame spaces according to a selection result;
wherein when each of the second inter frame spaces are compared with each of the first inter frame spaces of a same type, a value of said each of the second inter frame spaces is equal to or larger than a value of said each of the first inter frame spaces of the same type, a value of one of the second inter frame spaces of a first type is larger than a value of one of the first inter frame spaces of the first type, and the value of one of the second inter frame spaces of the first type is determined based on a value of an inter frame space used in a second communication scheme,
wherein the first communication scheme is a scheme for transmitting and receiving data between a plurality of devices, and wherein the second communication scheme is a scheme for transmitting and receiving data between a plurality of devices.

11. The method according to claim 10, wherein a sum of a first maximum transmission power and antenna gain of the first communication scheme is smaller than a sum of a second maximum transmission power and antenna gain of the second communication scheme.

12. The method according to claim 11, wherein the selecting either the first set or the second set comprises selecting the second set if an influence of a second apparatus using the second communication scheme on the first communication scheme is equal to or larger than a first threshold value.

13. The method according to claim 10, wherein the value of each second inter frame is equal to a sum of a period and the value of the first inter frame space identical in type to the second inter frame space.

14. The method according to claim 10, wherein the one of the first inter frame spaces and the one of the second inter frame spaces of the first type are used for starting a medium access, and the value of one of the first inter frame spaces of a second type used for transmitting a response frame is the same as the value of one of the second inter frame spaces of the second type, the response frame indicating a response to a frame.

15. The method according to claim 11, wherein the value of the one of the second inter frame spaces of the first type is equal to a sum of a value of an inter frame space in the second communication scheme and a value of half of a contention period in the second communication scheme, the contention period indicating a period of competition with other apparatuses and being selected from a range which includes at least one slot period in the second communication scheme.

16. The method according to claim 10, wherein the communicating with the first apparatus comprises measuring a period for which frames are continuously transmitted after an access right to a medium is acquired, and pausing transmission of frames if a value of the period is equal to or larger than a second threshold value.

17. The method according to claim 10,
wherein the selecting either the first set or the second set comprises setting one period for communication using the first set, and setting another period for communication using the second set, and
wherein the communicating with the first apparatus comprises using the first set for communication during the one period, and using the second set for communication during the other period.

18. The method according to claim 10,
wherein the selecting either the first set or the second set comprises setting one period for communication using the first set, and setting another period for communication using the second set, and
wherein if interference with a system that comprises a second apparatus that uses the first communication scheme is detected while communicating with the first apparatus, the communicating with the first apparatus comprises using the first set for communication during the one period, and using the second set for communication during the other period.

19. The apparatus according to claim 1, further comprising at least one antenna through which communication is performed.

20. The apparatus according to claim 2, further comprising at least one antenna through which communication is performed.

* * * * *